US006272128B1

(12) United States Patent
Pierson, Jr.

(10) Patent No.: US 6,272,128 B1
(45) Date of Patent: Aug. 7, 2001

(54) METHOD AND SYSTEM FOR EMULATING A T1 LINK OVER AN ATM NETWORK

(75) Inventor: Forrest L. Pierson, Jr., Dallas, TX (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/099,671

(22) Filed: Jun. 16, 1998

(51) Int. Cl.[7] .............................. H04L 12/66; H04L 12/56
(52) U.S. Cl. ....................... 370/352; 370/395; 370/466; 370/474; 370/528
(58) Field of Search ............................... 370/353–356, 370/352, 465–471, 474, 476, 487, 395, 396, 398, 527, 528, 529, 905, 907

(56) References Cited

U.S. PATENT DOCUMENTS

| 5,805,588 | * | 9/1998 | Petersen | 370/356 |
| 5,889,773 | * | 3/1999 | Stevenson, III | 370/352 |
| 5,933,607 | * | 8/1999 | Tate et al. | 370/468 |
| 5,970,067 | * | 10/1999 | Sathe et al. | 370/394 |
| 6,005,865 | * | 12/1999 | Lewis et al. | 370/398 |
| 6,018,525 | * | 1/2000 | Sucharczuk | 370/394 |
| 6,178,184 | * | 2/2001 | Petty | 370/503 |
| 6,195,346 | * | 2/2001 | Pierson, Jr. | 370/352 |

* cited by examiner

*Primary Examiner*—Seema S. Rao

(57) ABSTRACT

A method and system of emulating a T1 link over an ATM network. A T1 line carrying a stream of T1 frames is terminated at a first ATM Data Terminating Equipment (DTE). T1 frames are loaded into ATM cells and sent over an ATM network to a second ATM DTE. The T1 frames are unloaded at the second ATM DTE, and sent to a switch matrix to be de-multiplexed. In one example of T1 emulation, two T1 payloads are inserted in each ATM cell payload. The corresponding T1 frame bits replace the two least significant bits in the VCI field of the ATM cell header. For quasi-fractional T1 emulation, three or four quasi-fractional T1 payloads can be carried in the ATM cell payload. For fractional T1 emulation, multiple fractional T1 payloads are carried in a fractional payload field, and a frame bit field is created in the ATM cell payload to carry the T1 frame bits. The use of a T1 framer at the second DTE is avoided by insuring the T1 frame bit positions are constant over successive ATM cells.

40 Claims, 11 Drawing Sheets

Two T1 Frames carried in a single ATM cell

T1 Emulation over an ATM Network

Extended Superframe

ATM Cell Structure

Emulating T1 Link over ATM Network

Two T1 Frames carried in a single ATM cell

Emulating a Fractional T1 Link over ATM Network

ATM Cell Structure When Carrying Fractional T1 Frames

| Timeslot/Payload | Payloads/Cell | Framing Bit Encapsulation | Spare bytes |
|---|---|---|---|
| 3 | 15 | Frame bit field | 0 |
| 4 | 11 | Frame bit field | 1 |
| 5 | 9 | Frame bit field | 0 |
| Fractional 6 | 7 | Frame bit field | 3 |
| 7 | 6 | Frame bit field | 3 |
| 9 | 5 | Frame bit field | 0 |
| 11 | 4 | Frame bit field | 1 |
| Quasi-fractional 12 | 4 | Header | 0 |
| 16 | 3 | Header | 0 |
| T1 24 | 2 | Header | 0 |

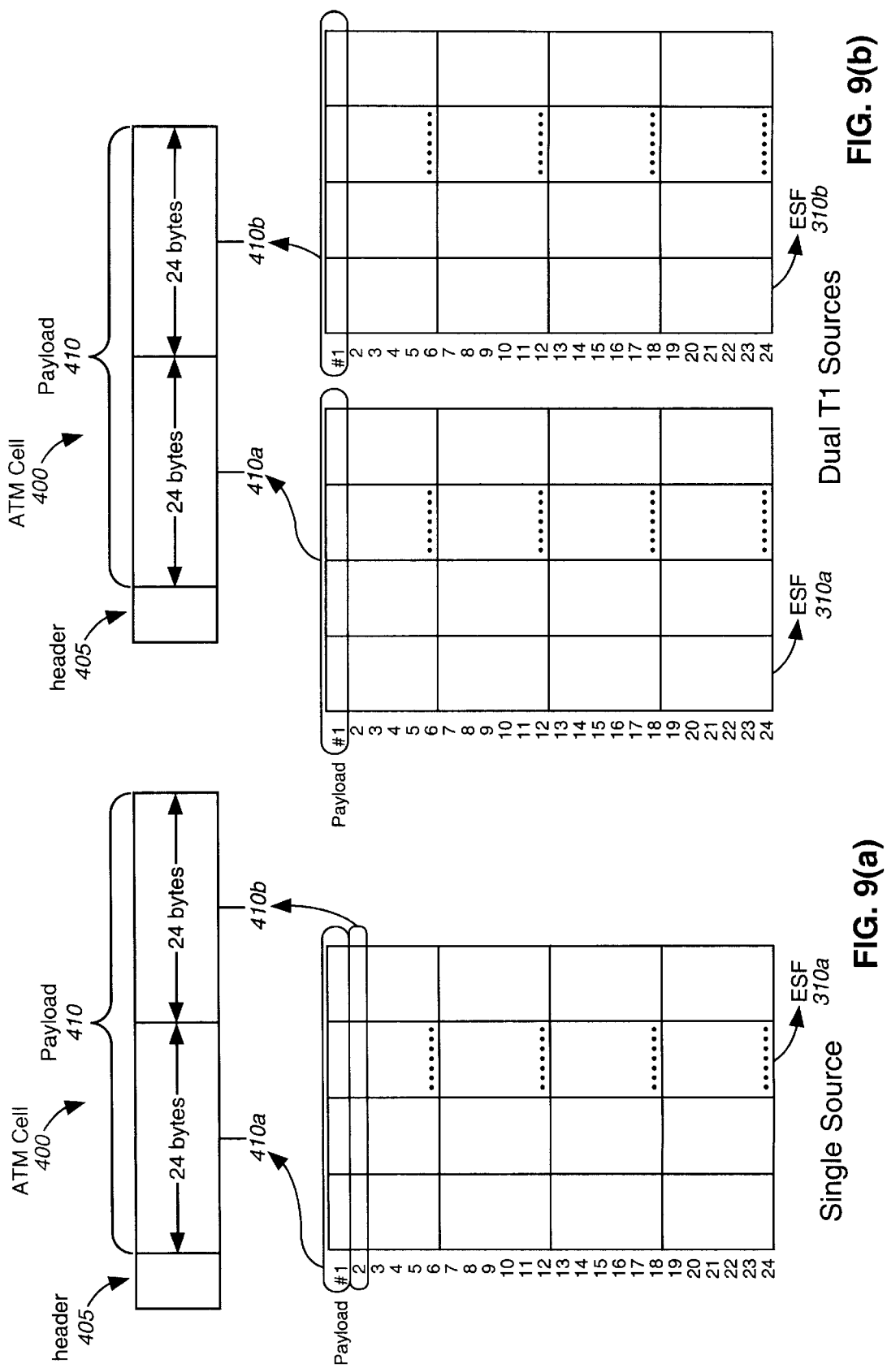

US 6,272,128 B1

METHOD AND SYSTEM FOR EMULATING A T1 LINK OVER AN ATM NETWORK

CROSS REFERENCE TO RELATED APPLICATIONS

This patent application is related to the following commonly owned, co-pending U.S. patent applications:

1. "Method and System for Processing an HDLC Message," Ser. No. 09/097,054, by Forrest Pierson, filed Jun. 16, 1998, now pending and incorporated herein by reference.

2. "Method and System for Unloading T1 Payloads from ATM Cells," Ser. No. 09/097,755, by Forrest Pierson, filed Jun. 16, 1998, now pending and incorporated herein by reference.

3. "Method, Apparatus, and Computer Program Product for Interfacing a TDM Line With Cell-Switched Network," Ser. No. 09/097,754, by Forrest Pierson, filed Jun. 16, 1998, now pending and incorporated herein by reference.

BACKGROUND OF THE INVENTION

1. Field of the Invention

The present invention relates generally to digital communications over an Asynchronous Transfer Mode (ATM) communications network.

2. Related Art

A communications network serves to transport information among a number of locations. The information is usually presented to the network in the form of time-domain electrical signals and can represent any combination of voice, video, or computer data. A typical communications network consists of various physical sites called "nodes", interconnected by conduits called "links". Each link carries information from one site to another site. Individual sites contain data terminating equipment (DTE) for combining, separating, and transforming data.

T1 (also known as DS1) is one type of digital communications link. T1 is a synchronous link capable of carrying 24 DS0 channels which are time domain multiplexed (TDM) and transmitted over a single physical line. A DS0 channel is a 64 kilobites per second (64 Kbps) channel, which is the world wide standard for digitizing voice conversation. This occurs because an analog voice signal can be adequately represented by a digital data stream if sampled at a rate of 8000 samples per second. If each voice sample is digitized using 8 bits, this results in a digital data stream of 64 Kbps.

A T1 link transmits one T1 frame 8000 times per second (or one frame every 125 $\mu$s). Each T1 frame contains a T1 payload with 24 DS0 timeslots, one for each DS0 channel with 8 bits in each timeslot. Each T1 frame also has T1 frame bit that identifies the start of the T1 frame, so that a T1 frame has a total size of 193 bits. This results in a data stream of 1.544 Mbps (8000 frames/sec·193 bits/frame).

A T1 superframe is a group of 12 T1 frames. Each superframe contains a frame bit section composed of 12 frame bits, and a payload section composed of 12 samples for each of the 24 DS0 channels. A T1 extended superframe (ESF) is a group of 24 T1 frames. Each ESF frame is composed of an ESF frame bit section that contains 24 frame bits, and an ESF payload section that contains 24 samples of each of the 24 DS0 channels.

Although T1 was developed for voice communications, it is not limited to voice communications. The physical line can carry digitized voice samples, digital computer data, or any other type of data in any combination in the 24 channels. Thus, a broader definition of a T1 link is a digital transmission link with a capacity of 1.544 Mbps.

Information concerning whether a channel is active, idle, ringing, etc., may be passed through the voice channel by borrowing, or robbing, one bit every $6^{th}$ frame. This process is called robbed bit signaling. Robbed bit signaling does not noticeably affect the quality of voice connections in a telephone network.

When robbed bit signaling is used and a voice channel is used to carry digital data, only 7 of the 8 bits in each frame can be counted upon to pass data through the network from one end to the other, as the $8^{th}$ bit is frequently modified as the robbed bit. This gives rise to a single DS0 channel carrying only 56 Kbps of data. An entire T1 link carrying digital data would carry 1.340 Mbps using this method. This is inefficient and for this reason a new standard for T1 transmission called Primary Rate ISDN (PRI) was developed to more efficiently move digital data through a T1 link.

The PRI format calls for a T1 link to not have robbed bit signaling. Instead, one of the 24 voice channels is dedicated for channel management (e.g. active, ringing, etc.) and is called the "D" channel. The other 23 channels, called bearer channels or "B" channels, may now use all 64 Kbps to carry digital data. An entire T1 link using PRI format can carry 1.430 Mbps. Industry standards frequently call this form of PRI 23B+D. Further efficiencies can arise when multiple T1 links between two end nodes exist. (An end node is a node where a call is originated or terminated; all other nodes along the entire link are used to only route the traffic through the telephone network). A single D channel in one link can carry all the necessary information for several T1 links. Two T1 links with a single D channel would be called 47B+D, and four T1 links would be called 95B+D. Some versions also carry a spare D channel in case the T1 link with the active D channel goes down.

The D channel carries High level Data Link Control (HDLC) messages about the B channels in all the T1 link(s) covered by that particular D channel. When a D channel carries an HDLC message it becomes known as the HDLC channel. Typically, the HDLC channel is the $24^{th}$ channel on a T1 link and occupies the $24^{th}$ timeslot in a T1 frame. The HDLC channel is used by the DTE equipment at the two end nodes to transmit link management messages. Examples of these link management messages are call setup and call tear-down.

Since T1 is a synchronous TDM link, once a channel connection has been setup between two users, that channel is dedicated until the connection is torn down. This channel dedication is an inefficient use of the 1.544 Mbps of T1 link capacity. For example, assume channel #5 of the 24 T1 channels is set up between user A and user B. Channel #5 will carry all communication between user A and user B. If there is a pause in the communication between user A and user B (such as user A putting user B on hold) during the transmission of a particular T1 frame, then that particular T1 frame will carry an empty channel #5 timeslot. Even a short pause of one minute can lead to 480,000 T1 frames being transmitted with an empty channel #5 timeslot. This is so even if channel #6 is being fully utilized by computer data at 64 Kbps. Because channel #5 is dedicated, the channel #6 user cannot send data over two channels (e.g. #5 and #6) for an effective rate of 128 Kbps.

Asynchronous Transfer Mode (ATM) is an asynchronous type of communications protocol. It is designed to be carried over the emerging fiber optical network, called the Synchronous Optical NETwork (SONET), although it can be carried over almost any communications link. The basic unit of ATM is the ATM cell. Each cell contains two parts; a header, which contains routing information, and a payload, which contains the data to be transported from one end node to another.

ATM is considered asynchronous because each node in the network does not know until after a cell arrives where it is intended to go. In a synchronous network, each timeslot is assigned a certain time when it is to arrive at each node. When it arrives will determine where a timeslot goes. Thus, the individual timeslots do not need to have routing information within them. The arrival of a particular ATM cell at a node, on the other hand, is not guaranteed to occur at a particular point in time.

There are a number of factors which makes ATM attractive to the telecommunications industry. One is the cost of the SONET transport mechanism. On a bit per bit basis, it is significantly less expensive than using metallic links by several factors often. The theoretical capacity of fiber is in excess of 20 tera bits per second (20 million million bits per second). Current technology is at 40 thousand million bits per second, and will soon increase to 160 thousand million bits per second. As technology improves, more information can be sent over each fiber optic buried in the ground.

On the other hand, metallic links that can span long distances and are reasonable to manufacture, have long ago reached their theoretical limits of roughly under 500 million bits per second, and are much bulkier than fiber optic links. The metallic link is also susceptible to rust and corrosion, whereas the fiber is relatively chemically inert. Because of signal attenuation (loss of signal strength as a signal travels down a link) on either type of link, repeaters which re-amplify the signal are needed. Metallic links attenuate the signals more than do fiber links, so more repeaters for metallic links are needed than for fiber links for a given distance. For instance, a T1 link can span a maximum of just over one mile (6000 feet) before a repeater is needed. It is not unusual for fiber optic links to span 50 to 100 miles between repeaters.

For this reason, it is now cost effective for two end nodes of a T1 link to convert their T1 signals into ATM cells, transport it across a SONET network, and then reconvert back to T1 at the other end. At the destination node, an ATM receiver unloads the T1 frames from the ATM cells. The ATM receiver sends the T1 frames to a switch matrix where the DS0 channels are de-multiplexed and sent to their particular user destinations. This approach is referred to as T1 emulation over an ATM network (or T1 over ATM, for short).

Conventional methods of T1 emulation over ATM involve transporting the T1 frame bit and T1 payload of particular T1 frame in the payload of an ATM cell. When a number of ATM cells are used to carry a stream of T1 frames, the T1 frame bit position(s) in the ATM cell payload vary over consecutive ATM cells. This occurs because a T1 frame is 193 bits in size and the payload of an ATM cell is 48 bytes or 384 bits in size. Thus, the payload of an ATM cell carries one complete T1 frame and a fraction of another T1 frame causing the T1 frame bit position(s) to vary from ATM cell to ATM cell.

In conventional T1 emulation, the T1 frame bit variation requires that the T1 frames be synchronized after they are unloaded from the ATM cells at the destination node. Synchronization is necessary to determine the location of the T1 frame bits, which serve to separate the T1 frames. Otherwise, the destination node switch matrix cannot de-multiplex the T1 frames because it is not known where one T1 frame ends and another begins.

In conventional T1 emulation, a T1 framer synchronizes a quantity T1 frames in ESF format by aligning the T1 data bit stream in 772 columns. This process is know as T1 framing. The T1 framer searches each column for a specific frame bit pattern that identifies the a column of frame bits. Once this pattern is found, the T1 frame bit positions are identified and the following T1 frames are synchronized.

The significance of the 772 columns is that one synchronization bit occurs every 772 bits of a 4632 bit ESF frame. Thus, an entire ESF frame occupies 6 rows of 772 columns. When properly synchronized, one of these columns will contain all 6 synchronization bits.

When the T1 frames are in ESF format, a second layer of synchronization is required to find the T1 frame #1 of the 24 T1 frames in an ESF frame. This process is known as ESF framing and is done by an ESF framer, as opposed to a T1 framer. In other words, the T1 framer determines the location of the T1 frame bits so that successive T1 frames can be distinguished, and the ESF framer determines T1 frame #1 in an ESF frame so that successive ESF frames can be distinguished.

Both T1 framing and ESF framing must be done whenever synchronization is lost for whatever reason. However, T1 framing requires more complicated hardware and takes longer than ESF framing because a greater number of bits must be examined. What is needed is a method and system of T1 emulation over ATM that reduces the amount of framing required when synchronization is lost.

SUMMARY OF THE INVENTION

The present invention relates generally to voice and data communications. In particular, the present invention relates to a method and system of emulating a T1 communications link over an Asynchronous Transfer Mode (ATM) communications network. Otherwise known as "T1 over ATM."

In one embodiment of the invention, a T1 line is terminated at an ATM Data Terminating Equipment (DTE,), and two T1 frames are loaded into each ATM cell sent over the network. This is done by inserting two T1 payloads in the ATM cell payload, and replacing two bits in the ATM cell header with the corresponding T1 frame bits. The T1 bearing ATM cell is sent over an ATM network to a $DTE_2$. At the $DTE_2$, the overhead portion of the ATM cell is processed by reading the T1 frame bits in the ATM cell header, and further reading the HDLC timeslots in the T1 payloads if the T1 channel is Priliminary Rate ISDN (PRI). Next, the T1 payloads are unloaded from the ATM cell and de-multiplexed at a switch matrix.

An advantage of the present invention is that at a T1 framer is not needed at the receiving $DTE_2$ to determine the location of the T1 frame bits. This results because the T1 flame bit positions are fixed from one ATM cell to another. In one embodiment, the T1 frame bits replace the least significant bits in the Virtual Channel Indicator (VCI) field in the header of the ATM cell.

In another embodiment, the T1 link is a quasi-fractional T1 link that is carrying quasi-fractional T1 frames. A quasi-fractional T1 frame is defined as a T1 frame that only uses 12 or 16 timeslots of the 24 available timeslots, so that 4 or 3 quasi-fractional T1 frames may be loaded in each ATM cell, respectively. Since, the remaining timeslots are not used, they may be omitted to achieve greater efficiencies. Quasi-fractional T1 utilizes the same ATM cell structure as T1 emulation except that 4 or 3 quasi-fractional T1 payloads may be inserted into the ATM cell payload. The corresponding T1 frame bits replace the least significant bits in the ATM cell header.

In another embodiment, the T1 link is a fractional T1 link that is carrying fractional T1 frames. A fractional T1 frame is a T1 frame that carries less than 24 timeslots.

Fractional T1 emulation is done by loading one or more fractional T1 frames into each ATM cell. The ATM cell payload is divided into four distinct fields including: fractional payload field, frame bit field, checksum field, and spare byte field. One or more fractional T1 payloads are inserted in the fractional payload field. The corresponding T1 frame bits are inserted in the frame bit field. The checksum field is created to detect bit errors in the frame bit field caused by the physical line during cell transmission. The spare byte field compensates for any variation length of the fractional payload field and insures that the entire 48-byte capacity of the ATM cell payload will be occupied.

BRIEF DESCRIPTION OF THE FIGURES

The accompanying figures, which are incorporated herein and form part of the specification, illustrate the present invention and, together with the description, further serve to explain the principles of the invention and to enable a person skilled in the pertinent art to make and use the invention. In the figures:

FIG. 9A is a diagram that illustrates single T1 source operation.

FIG. 9B is a diagram that illustrates dual T1 source operation.

Figure 1:
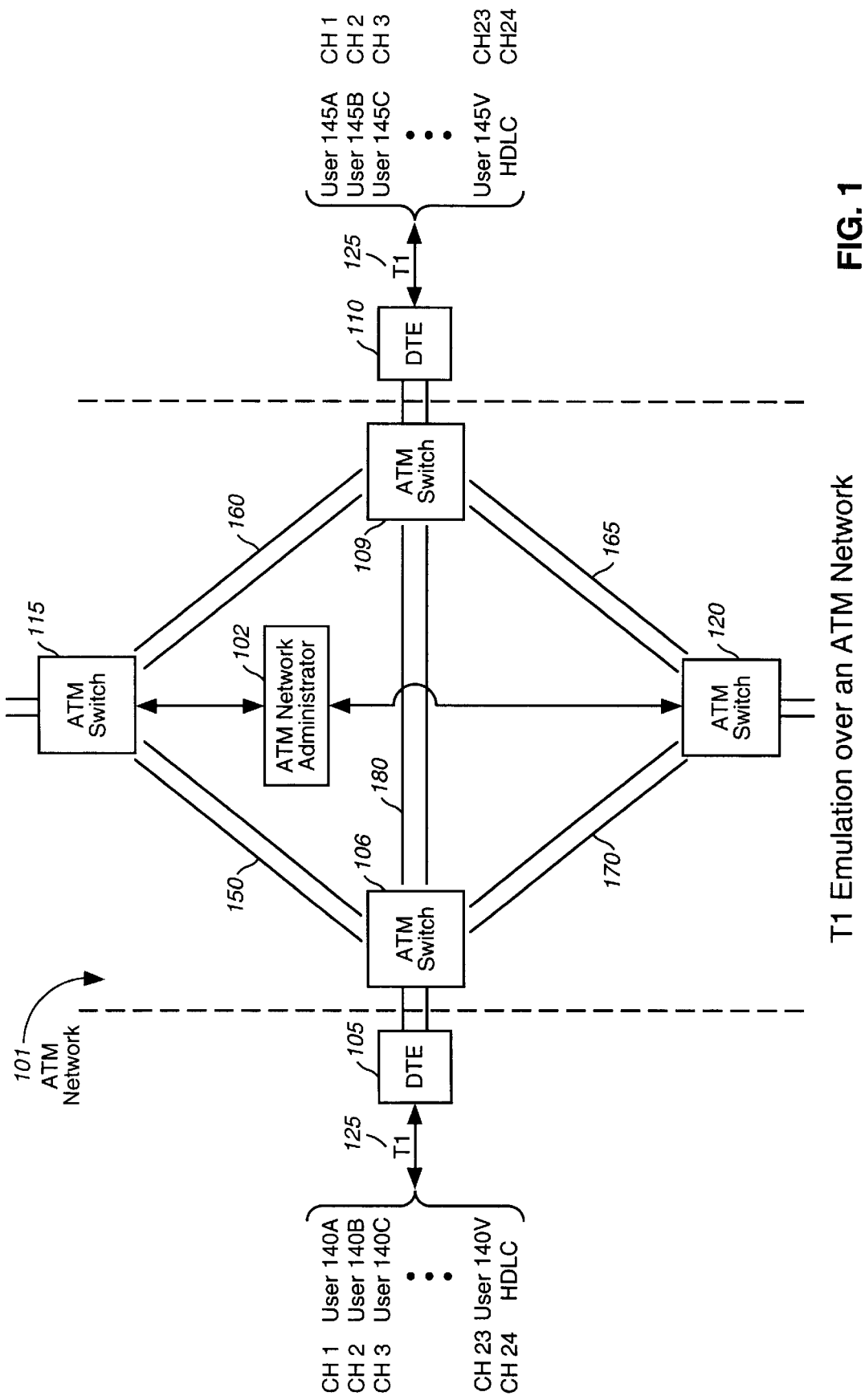
FIG. 1 is a block diagram that illustrates T1 emulation over an ATM network.

The present invention is described with reference to the accompanying figures. The following convention is generally adhered to in assigning reference numbers. In the figures, like reference numbers often indicate identical or functionally similar elements. Additionally, the left-most digit(s) of a reference number identifies the figure in which the reference number first appears.

DETAILED DESCRIPTION OF THE PREFERRED EMBODIMENTS

| | Table of Contents |
|---|---|
| I. | Overview |
| II. | Terminology |
| III. | Example Environment |
| IV. | T1 Frame and T1 Extended Superframe |
| V. | ATM Cell Structure |
| VI. | T1 Elimination over an ATM Network |
| | A. T1 and Quasi-fractional T1 Emulsion |
| | B. ATM Cell Structure for Carrying T1 Frames and Quasi-fractional T1 Frames |
| VII. | Fractional T1 Emulsion over an ATM Network |
| | A. Fractional T1 Emulation |
| | B. ATM Cell Structure for Carrying Fractional T1 Frames |
| VIII. | Single, Dual, and Multiple T1 Source Operation |
| IX. | Loading T1 payloads into ATM Cells |
| X. | Unloading T1 payloads from ATM Cells |
| XI. | E1 Emulation |
| XII. | Computer Implementation of the Invention |

I. Overview

The present invention is directed toward emulating a T1 link over an ATM network. T1 frames are loaded into an ATM cell at a $DTE_1$ and sent over an ATM network to a $DTE_2$. The present invention loads the T1 frames into the ATM cell in a manner that the T1 frames do not need frame synchronization when received at $DTE_2$. This is done by separating the T1 frame bits from their corresponding T1 payloads and inserting the T1 frame bits in fixed bit positions over consecutive ATM cells. For T1 and quasi-fractional T1 emulation, the T1 frame bits are carried in the ATM cell header, and a whole number of T1 or fractional T1 payloads are carried in the ATM cell payload. For fractional T1 emulation, the T1 frame bits are carried in a frame bit field of the ATM cell payload, and a whole number of fractional T1 payloads are carried in fractional payload field of the ATM cell payload.

II. Terminology

To more clearly delineate the present invention, an effort is made throughout the specification to adhere to the following term definitions as consistently as possible. These definitions may be discussed throughout the specification with additional detail.

"Asynchronous Transfer Mode (ATM)" refers to a fast cell switched technology based on a fixed-length 53-byte cell. All broadband transmissions are divided into a series of cells and routed across an ATM network consisting of links connected by ATM switches. An ATM network carries a constant stream of ATM cells, but has the ability to allocate bandwidth on demand among multiple users.

"DTE" refers to Data Terminating Equipment at communications nodes for combining, separating, and transforming data "DS0 channel" refers to a standard 64 Kbps channel that carries voice communications, computer data communications, or any other data communications.

"E1" refers to the European version of T1. E1 is capable of carrying 32 distinct 64 Kbps channels, verses 24 for T1.

"Fractional T1" refers to a T1 link that supports less than 24 distinct DS0 channels. T1 frames carried on fractional T1 links carry a reduced number of timeslots which corresponds to the reduced number of channels support.

"Frame slip" refers to the condition that results when ATM cells are stored in the cell buffer at a faster or slower rate than ATM cells are being drained out of the cell buffer. If corrective action is not taken, the cell buffer will eventually fill to capacity or empty out.

"Quasi-fractional T1" refers to a T1 link with either 12 or 16 DS0 channels. A quasi-fractional T1 frame carries either 12 or 16 timeslots in its quasi-fractional T1 payload.

"T1" refers a time domain multiplexed (TDM) digital transmission link. T1 is capable of carrying 24 distinct 64 Kbps channels. In the United States, Canada, Hong Kong, and Japan, the T1 line bit rate is 1.544 Mbps.

"T1 frame" refers to the basic unit of T1 communications. A T1 frame consists of a T1 frame bit and a T1 payload "T1 payload" refers to the portion of a T1 frame that carries the data for the 24 distinct 64 Kbps channels. A T1 payload consists of 24 timeslots, one timeslot for each of the 24 distinct 64 Kbps channels carried by a T1 line. Each timeslot carries a one byte sample of the respective channel message. T1 payloads on fractional T1 lines consist of a reduced number of timeslots.

"Timeslot" refers to a portion of a T1 payload that carries the one byte sample of the channel message. In this application, the timeslot definition includes the one-byte channel message sample.

III. Example Environment

Before describing the present invention in further detail, it is helpful to describe an example environment in which the invention can be implemented. It is not intended that the invention be limited to the example environment. In fact, after reading the following description, it will become apparent to a person skilled in the relevant art how to implement the invention in alternative environments.

One such environment is the use of an ATM network to emulate a T1 link. A simple illustration is shown in FIG. 1 where one or more users 140A–140V (23 users, 1 for each DS0 channel ) want to have voice or data communication with one or more users 145A–145V over T1 line 125. This can be done over ATM network 101 by terminating T1 line 125 at DTEs 105 and 110, and sending the T1 frames over ATM network 101 in ATM cells. DS0 channel #24 is a high level data link control channel (HDLC) used to carry system level messages between DTE 105 and DTE 110.

DTE 105 packages the T1 frames in ATM cells and sends them to ATM switch 106. ATM switch 106 determines the route to DTE 110 that is the most appropriate. Link 180 to ATM switch 109 is clearly the most direct. But it may be that the level of existing data traffic on link 180 would require storage of the ATM cells before they can be sent on link 180. This may occur if network administrator 102 has directed that ATM switches 115 or 120 send cells on link 180.

Thus, ATM switch 106 may choose to send the ATM cells over link 150 to ATM switch 115 to avoid excessive traffic. If so, ATM switch 115 reads the address in an ATM cell header and sends the ATM cells to ATM switch 109 via link 160. Alternatively, ATM switch 106 may choose to send ATM cells to ATM switch 120 via link 170. If so, ATM switch 120 reads the address in an ATM cell header and sends the ATM cells to ATM switch 109 via link 165. In either case, ATM switch 109 reads the address the ATM cell header and forwards the ATM cells to DTE 110.

The ATM network 101 components (including DTEs, ATM switches, routers, and other network equipment) illustrated in FIG. 1 may contain various storage buffers or memory components for storing ATM cells during transport through ATM Network 101.

IV. T1 Frame and T1 Extended Superframe

Figure 2:
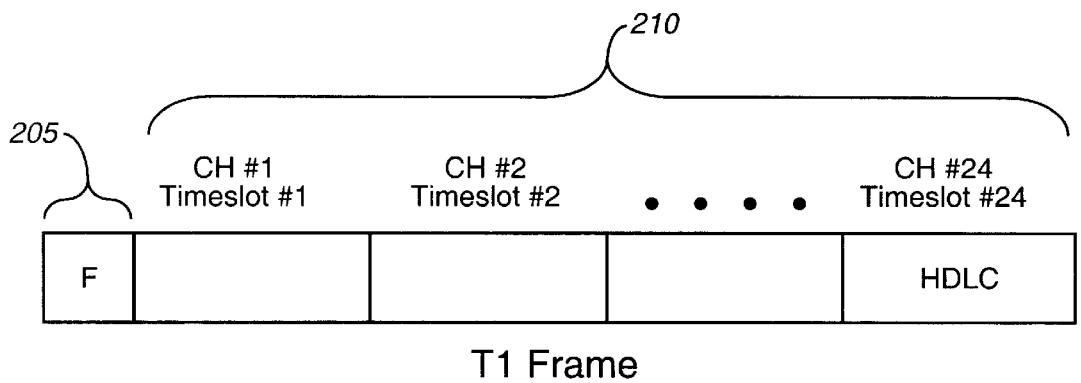
FIG. 2 is a diagram that illustrates the structure of a T1 frame.

FIG. 2 illustrates an example T1 frame carried by T1 line 125 in FIG. 1. The T1 frame consists of a T1 frame bit 205 and a T1 payload 210. T1 payload 210 consists of 24 multiplexed DS0 timeslots, where each DS0 timeslot carries one byte of a link user message. T1 line 125 transmits 8000 T1 frames per second, which results in each of the 24 DS0 channels having a bit rate of 64 Kbps.

Timeslot #24 in the T1 frame is used for the high level data link control (HDLC) channel. The HDLC channel carries link management messages back and forth between DTE 105 and DTE 110. Examples of these link management messages are call setup, and call teardown messages. For example, DTE 105 and DTE 110 communicate system information to setup a connection over ATM network 101 when user 140A wants to send data to user 145A over T1 line 125. Likewise, DTE 105 and DTE 110 communicate to tear down the connection when user 140A or user 145A terminates the data transfer.

A fractional T1 link is a T1 link that supports less than 24 distinct DS0 channels. The number of timeslots in a fractional T1 frame is reduced accordingly. For example, if the fractional T1 link supports 11 distinct 64 Kbps channels, each T1 frame will have 11 corresponding timeslots in its fractional payload. Typically, a fractional T1 link still carries 8000 fractional frames per second regardless of the number of channels supported.

In this specification, the term "fractional T1 frames" will be used to refer to frames with less than 24 timeslots, except for frames with either 12 or 16 timeslots. Frames with either 12 or 16 timeslots will be referred to as "quasi-fractional T1 frames". The reason for this distinction is that the ATM cell structure differs depending on whether it is quasi-fractional or fractional emulation.

Figure 3:
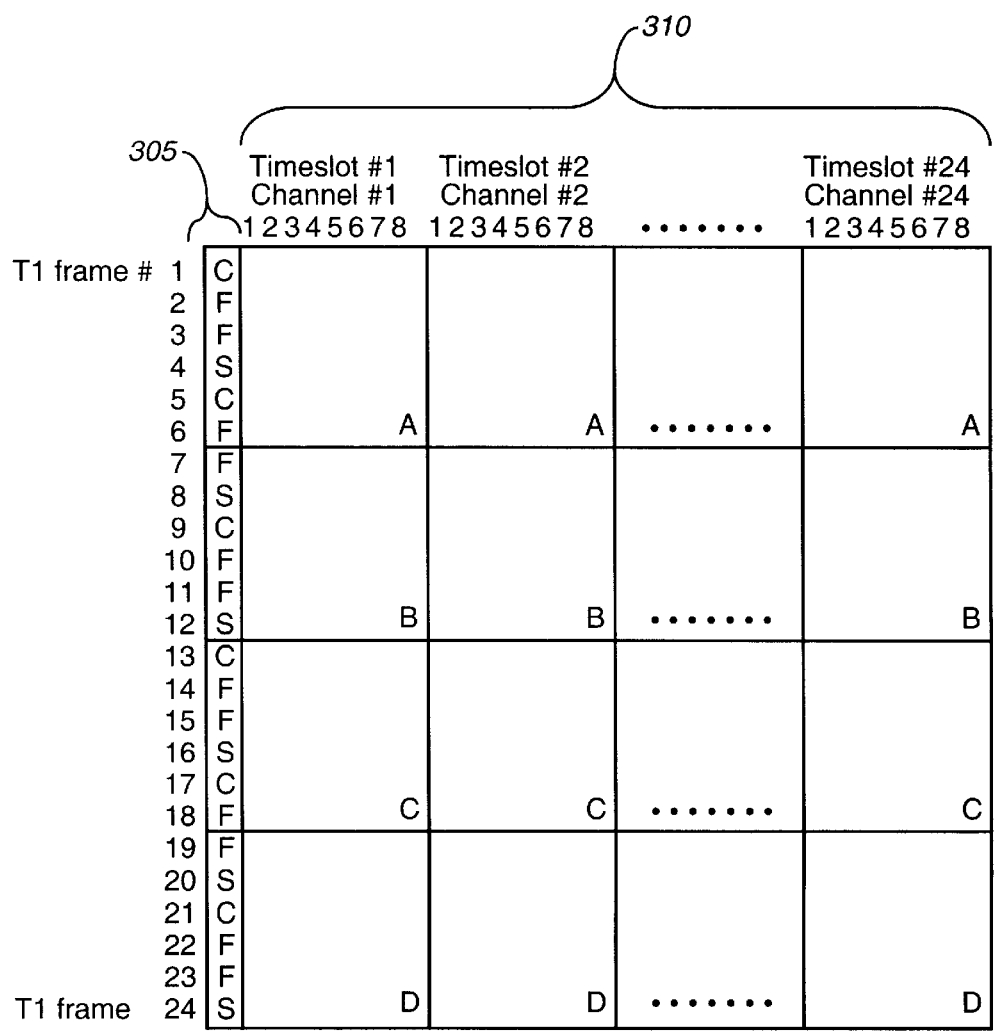
FIG. 3 is a diagram that illustrates the structure of a T1 Extended Superframe.

FIG. 3 represents an Extended Superframe (ESF), which is a group of 24 T1 frames that can be carried by T1 line 125. An Extended Superframe consists of frame bit section 305 and a payload section 310.

Frame bit section 305 consists of 24 frame bits that can be one of three different types. Six of the frame bits are synchronization bits ("S" bits). An ESF framer uses the S bits to determine the start of an Extended Superframe. Six of the frame bits are error checking bits ("C" bits) that implement the Cyclic Redundancy Check (CRC-6) method. The CRC-6 test discovers bit errors in the ESF frame bit section caused by the physical line during transmission. Twelve of the frame bits ("F" bits) are used for a Facilities Data Link channel (DL channel). If the CRC-6 test fails for a number of received ESFs, then a status message will be sent to network administrator 102 over the DL channel to give notice of the CRC-6 failures. Network administrator 102 may perform a restoration operation to re-route network traffic and may even dispatch a technician to inspect and repair the physical line based on the status message.

V. ATM Cell Structure

Figure 4:
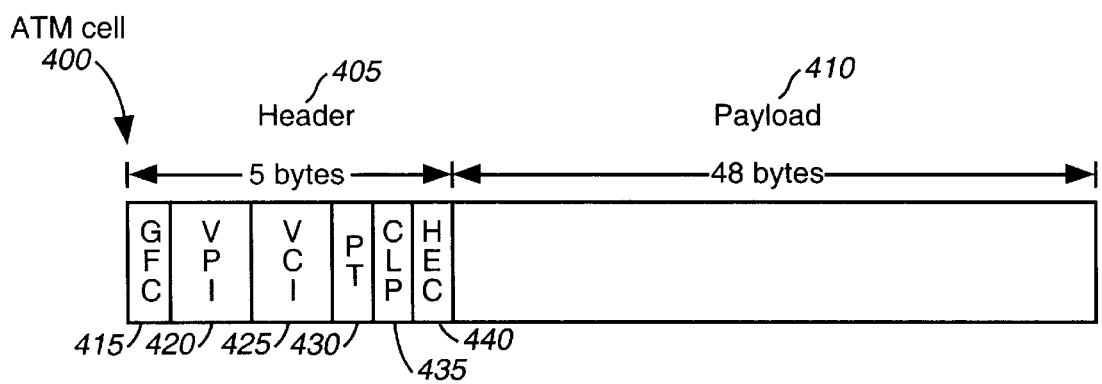
FIG. 4 is a diagram that illustrates the structure of an ATM cell.

FIG. 4 depicts the structure of the typical ATM cell sent over ATM network 101. ATM cell 400 consists of ATM header 405 and ATM payload 410. The ATM header 405 is 5 bytes in length and the ATM payload 410 is 48 bytes (or 384 bits) in length.

ATM header 405 contains 5 distinct fields. In general the ATM header 405 is used to identify the destination, cell type, and priority of the ATM cell. The ATM header fields are as follows: 4 bit generic flow control (GFC) field 415, 12 bit virtual path indicator (VPI) field 420, 2 byte virtual channel indicator (VCI) field 425, 3 bit payload type (PT) field 430, 1 bit cell loss priority (CLP) field 435, 1 byte header error check (HEC) field 440.

GFC field 415 is reserved to carry the ATM cell flow rate as set by DTE 105 in FIG. 1. VPI field 420 and VCI field 425 are used to identify the destination address of a particular ATM cell. This allows ATM switches 115 and 120 to recognize that a particular ATM cell is destined for DTE 105 or DTE 110. PT field 430 indicates whether a cell contains user data (e.g., voice conversations), signaling data, or something else. CLP bit 435 indicates the relative priority of the cell. Lower priority cells are discarded before higher priority cells during intervals of congestion. HEC field 440 is used to detect errors in the header caused by the physical line during transmission.

As stated above, GFC field 415 is reserved to carry cell flow rate data, but typically this is not implemented. In one embodiment, GFC field 415 is merged with VPI field 420 to provide a larger 12 bit VPI field. The larger VPI field is used for transmission of cells between components (switches, DTEs) of ATM network 101. This is known as network node interface (NNI).

In an alternative embodiment, GFC field 415 and VPI field 420 are kept separate, and the GFC field 415 is filled with all logic zeros. Any bits set to logic one in the GFC field is ignored. This embodiment is used for transmission of cells between ATM network 101 and end users. This is known as user network interface (UNI).

VI. T1 Emulation Over an ATM Network

Figure 5:
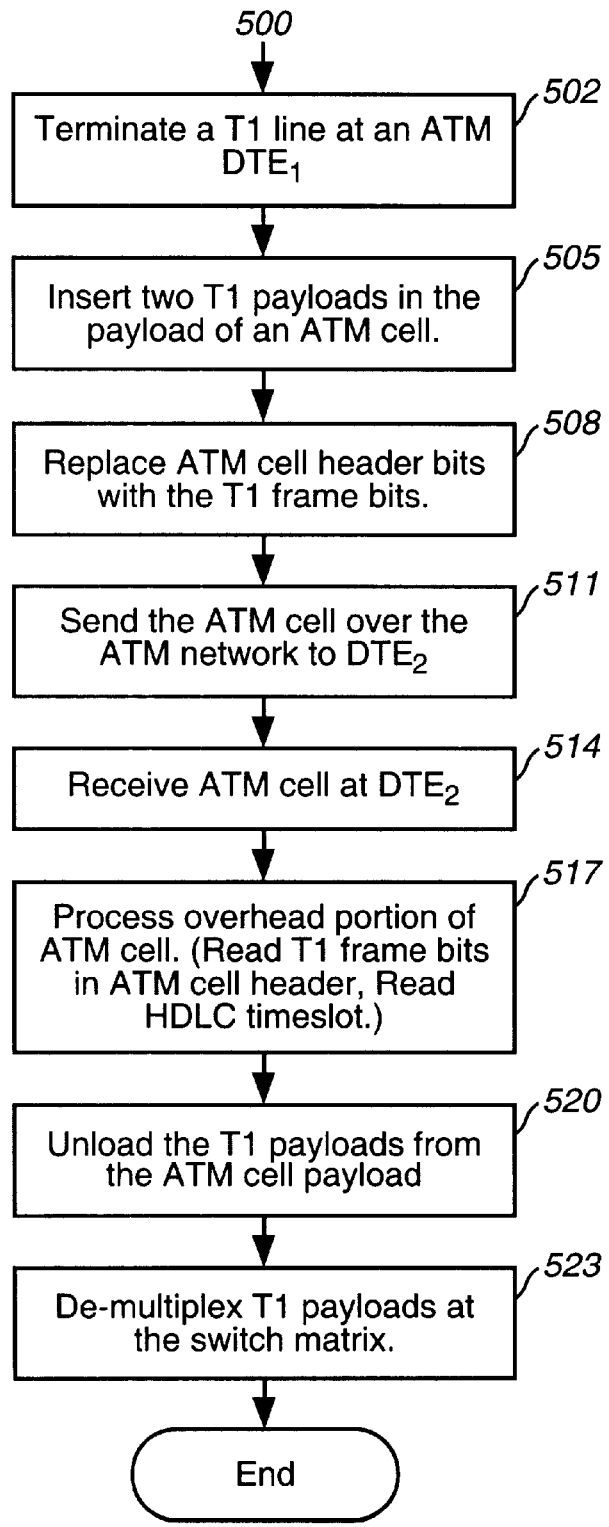
FIG. 5 is a flowchart that illustrates the steps of emulating a T1 link over an ATM network according to the present invention.
Figure 6:
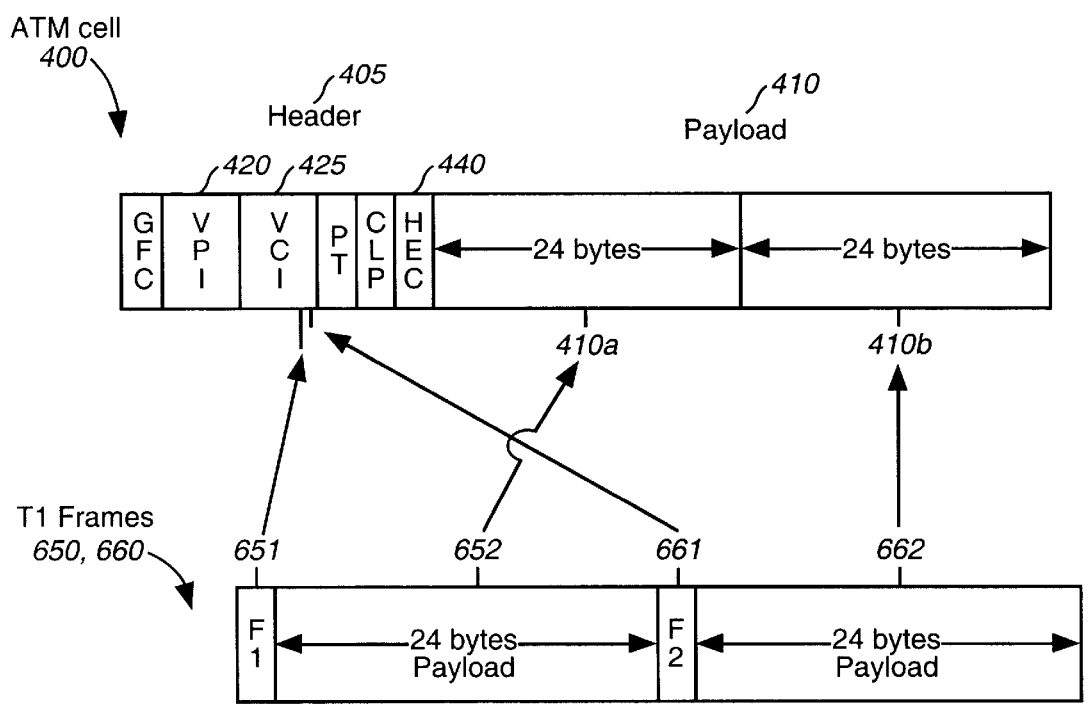
FIG. 6 is a diagram that illustrates the ATM cell structure used to carry T1 frames or quasi-fractional T1 frames over an ATM network according to the present invention.
Figure 7:
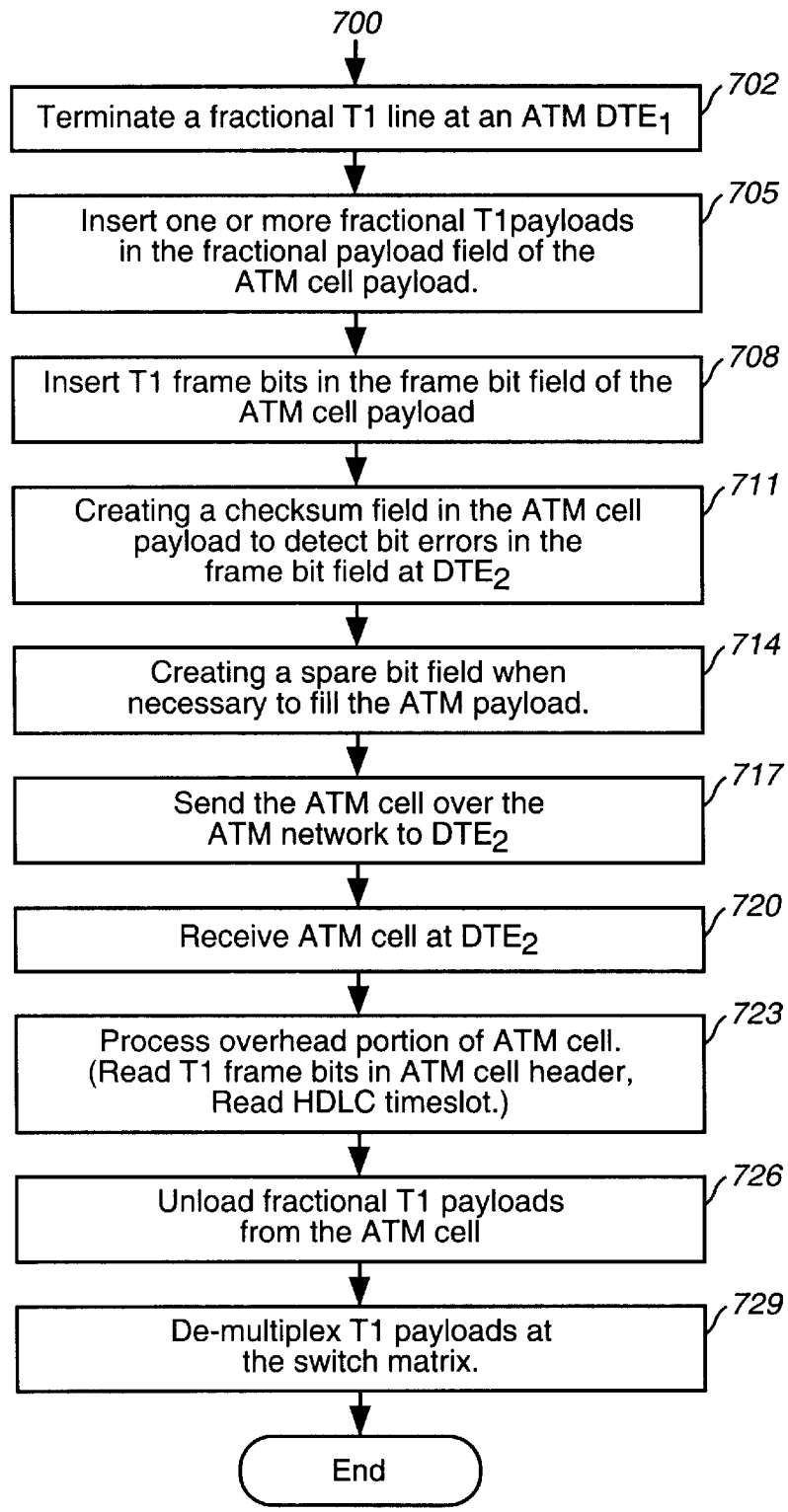
FIG. 7 is a flowchart that illustrates the steps of emulating a fractional T1 link over an ATM network according to the present invention.
Figures 8A, 8B:
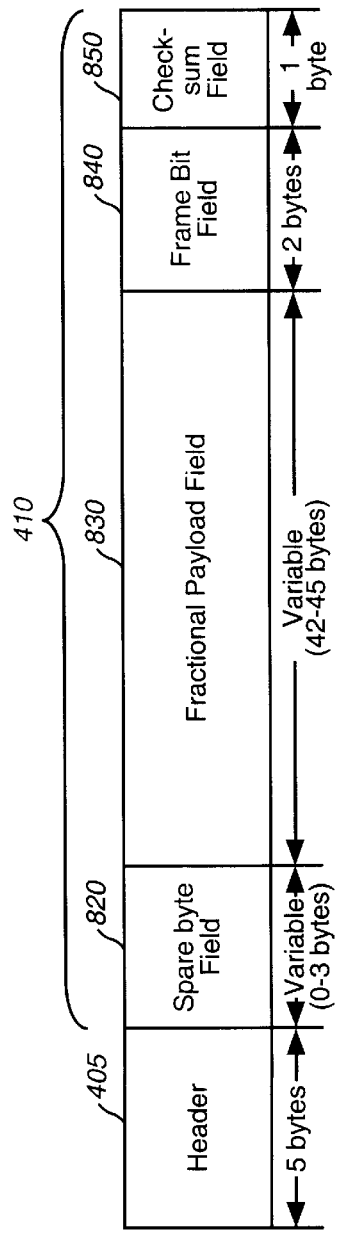
FIG. 8A is a diagram that illustrates the ATM cell structure used to carry fractional T1 frames over an ATM network according to the present invention.
FIG. 8B is a table illustrating the number of payloads that may be carried in an ATM cell vs. number of timeslots per payload according to the present invention.

FIG. 5 is an operational flowchart illustrating routine 500 for T1 emulation over an ATM network according to one embodiment of the present invention. Quasi-fractional T1 emulation over ATM, according to another embodiment of the present invention, will also be discussed with reference to FIG. 5. FIG. 6 illustrates the ATM cell structure used to carry T1 frames and quasi-fractional T1 frames according to the present invention. FIGS. 7, 8A, and 8B illustrate fractional T1 emulation over an ATM network according to another embodiment of the present invention.

A. T1 and Quasi-fractional T1 Emulation.

Routine 500 covers steps for emulating a T1 link over an ATM network performed at an originating and destination ATM DTEs. Steps 502–511 are generally performed at an originating ATM DTE. An ATM transmitter can perform steps 505 and 508 and a SONET transmitter can perform step 511, as described in more detail with respect to FIG. 10. Steps 514–523 are generally performed at a destination DTE. A SONET receiver can perform step 514, and a ATM receiver can perform steps 517–523, as further described with respect to FIG. 11.

In step 502, a T1 line carrying a stream of T1 frames is terminated at an ATM DTE$_1$, such as ATM DTE 105 in FIG. 1.

In step 505, two T1 payloads are inserted into the payload of an ATM cell. As discussed earlier, the payload of an ATM cell is 48 bytes in length. The payload of a single T1 frame is 24 bytes, so that two T1 payloads can fit exactly in an ATM cell payload. This is but one embodiment. In an alternate embodiment, exactly one T1 payload is inserted in the ATM cell payload. However, carrying a single T1 payload in an ATM cell is less efficient than carrying two T1 payloads in the ATM cell.

In another alternate embodiment, the T1 link is a quasi-fractional T1 link. A quasi-fractional link is defined in this specification as a T1 link that supports either 12 or 16 DS0 channels (instead of 24 for standard T1). A quasi-fractional T1 frame contains a T1 frame bit, and a quasi-fractional payload that contains either 12 or 16 timeslots. Each 48-byte ATM cell payload can carry 4 quasi-fractional payloads with 12 timeslots, or 3 quasi-fractional T1 payloads with 16 timeslots.

In step 508, the T1 frame bits replace ATM cell header bits, where the T1 frame bits correspond to the T1 payloads inserted in the ATM cell payload in step 505. The T1 frame bits are carried in the ATM cell header because the T1 payloads utilize the entire 48 bytes of the ATM cell payload. In one embodiment, the T1 frame bits replace the least significant bits in the virtual channel indicator (VCI) field of the ATM cell header. In one example, two T1 payloads are carried in an ATM cell payload, and the corresponding two T1 frame bits replace the two least significant bits in the VCI field of the ATM cell header. In another example, 4 quasi-fractional T1 payloads are carried in the ATM cell payload, and the corresponding T1 frame bits replace the 4 least significant bits in the VCI field of the ATM cell header.

In an alternate embodiment of step 508, the T1 frame bits replace any other non-critical bits in the ATM cell header. For example, the T1 frame bits may replace other bits of the VCI field when the VCI field is not needed with the virtual path indicator field (VPI) field to uniquely identify an ATM address location.

In step 511, the ATM cell is sent over the ATM network to a destination DTE$_2$. This requires that the ATM cell be carried by an ATM bearing carrier signal. SONET is one physical standard designed for high speed fiber optical communications that supports ATM communications. If SONET is used, then a SONET transmitter loads the ATM cells in SONET frames and transmits a SONET signal over optical fibers to a destination DTE$_2$. The present invention is not limited to use with a SONET carrier signal. Any ATM bearing physical signal can be used.

In step 514, the ATM cell carrying the T1 frames is received at DTE$_2$. In step 517, the overhead portion of the ATM cell is processed. Overhead processing includes reading the T1 frame bits in the ATM cell header and reading the HDLC timeslots in the ATM cell payload.

One advantage of the carrying the T1 flame bits in the ATM cell header is that the overhead portion of the ATM cell can be processed without a preliminary step of synchronizing the T1 frames with a T1 framer. This is possible because the T1 frame bit and HDLC timeslot positions are fixed over successive ATM cells. Thus, there is no need to search for their location with a T1 framer. For example, the T1 frame bits may occupy the least significant bits in the VCI field of the ATM cell header in each ATM cell. The HDLC timeslot position is the last timeslot in each T1 payload. Since an integer number of T1 payloads are carried in the ATM cell payload, the HDLC timeslot positions can easily be determined from the end of the standard 5-byte ATM cell header.

In conventional T1 emulation, the T1 frame bits are carried in the ATM cell payload, attached to their corresponding T1 payloads. As discussed earlier, this results in each ATM cell carrying a non-integer number of T1 frames which causes the T1 frame bit position(s) [and every timeslot position] to vary over successive ATM cells. Thus in conventional T1 emulation, a T1 framer must synchronize a plurality of T1 frames to identify the T1 frame bit position(s) before either the T1 frame bit(s) or the HDLC timeslot(s) can be read. Once T1 framing is complete, the T1 frame bit position(s) are known and the HDLC timeslot position(s) can be determined.

T1 framing is time consuming and requires complicated hardware. The present invention avoids the T1 framing step because the T1 frame bits are carried in fixed positions in the header of each ATM cell, and an integer number of T1 frames or quasi-fractional T1 frames are carried in payload of each ATM cell. This permits the T1 frame bits and HDLC timeslots to be read without any T1 framing because the bit locations are known and constant from one ATM cell to the next.

In step 520, the T1 payloads are unloaded from the ATM cell and sent to a switch matrix. In step 523, the switch matrix de-multiplexes the T1 payloads and sends the timeslots that comprise the T1 payloads to their respective link users.

B. ATM Cell Structure for Carrying T1 Frames and Quasi-fractional T1 Frames.

FIG. 6 illustrates one embodiment of how the present invention carries two T1 frames in each ATM cell that travels over ATM network 101. ATM cell 400 has an ATM header 405 and an ATM payload 410. T1 frame 650 has a T1 frame bit 651 and a T1 payload section 652. Likewise, T1 frame 660 has a T1 frame bit 661 and a T1 payload section 662.

T1 payload sections 652 and 662 are both 24 bytes in size or 48 bytes total. ATM payload 410 is also 48 bytes in size, so that exactly two T1 payloads can fit within an ATM cell payload. ATM payload section 410a carries T1 payload 652. Likewise, ATM payload 410b carries T1 payload 662. ATM payload section 410a is the first 24 bytes of ATM payload 410. ATM payload section 410b is the second 24 bytes of ATM payload 410.

T1 frame bits 651 and 661 cannot be carried in the ATM payload 410. This is because T1 payloads 652 and 662 occupy the entire 48 byte capacity of ATM payload 410. Thus, the present invention carries the T1 frame bits 651 and 661 in the ATM cell header 405.

In one embodiment, T1 frame bits 651 and 661 replace the two least significant bits in VCI field 425 of the ATM header 405. VCI field 425 is 2 bytes in size and is one of two address fields in ATM header 405 (VPI field 420 being the other). ATM switches 115 and 120 use the address fields in ATM network 101 to route ATM cells to their proper destination DTE. By replacing the two least significant bits in VCI field 425 with T1 frame bits 651 and 661, the number of possible destination DTEs will be reduced, but not significantly.

In an alternate embodiment, T1 frame bits 651 and 661 replace any of the other bit locations of the VCI field 425.

In another alternate embodiment, ATM cell 400 carries exactly one T1 frame, where the one T1 frame bit is carried in ATM header 405, and the one T1 payload is carried in the ATM payload 410. This would not be as efficient as carrying two T1 frames within each ATM cell, but still offers the advantage of having the T1 frame bit position fixed in ATM header 405 over consecutive ATM cells.

In another alternate embodiment, ATM cell 400 carries quasi-fractional T1 frames. Quasi-fractional T1 frames are T1 frames with quasi-fractional T1 payloads that carry either 12 or 16 timeslots (instead of the standard 24). In one example, ATM cell payload 410 carries 4 quasi-fractional T1 payloads with 12 timeslots, and the corresponding T1 frame bits replace the 4 least significant bits in VCI field 425. In another example, ATM cell payload 410 carries 3 quasi-fractional T1 payloads with 16 timeslots, and the corresponding T1 frame bits replace the 3 least significant bits in VCI field 425.

VII. Fractional T1 Emulation

A. Method of Fractional T1 Emulation

FIGS. 7, 8A, and 8B illustrate fractional T1 emulation over an ATM network. In this specification, a fractional T1 link supports less than 24 DS0 channels, and the number of timeslots in a fractional T1 payload is reduced accordingly. FIG. 7 is an operational flowchart illustrating routine 700 for fractional T1 emulation over an ATM network according to one embodiment of the present invention. FIG. 8A illustrates the ATM cell structure used to carry fractional T1 frames. FIG. 8B is a table relating the size of a fractional T1 payload to the number fractional payloads that can be carried in an ATM cell.

Routine 700 covers the steps for emulating a fractional T1 link over an ATM network performed at originating and destination ATM DTEs. Steps 702–717 are generally performed at an originating ATM DTE. An ATM transmitter can perform steps 705–715, and a SONET transmitter can perform step 717, as further described in FIG. 10. Steps 720–729 are generally performed at a destination DTE. A SONET receiver can perform step 720, and an ATM receiver can perform steps 720–726 as further described in FIG. 11. A switch matrix can perform step 729.

In step 702, a fractional T1 line is terminated at an ATM $DTE_1$, such as ATM DTE 105 in FIG. 1. The fractional T1 line carries a stream of fractional T1 frames. Each fractional T1 frame contains a T1 frame bit and a fractional T1 payload with less than 24 timeslots.

In step 705, one or more fractional T1 payloads are inserted into the fractional payload field of an ATM cell payload. The fractional payload field varies from 42–45 bytes in length and occupies the majority the 48-byte ATM cell payload. The number of fractional T1 payloads carried in the fractional payload field varies inversely with the number of channels (and timeslots) supported by the fractional T1 link. In one example, 5 fractional T1 payloads with 9 timeslots are inserted into the fractional payload field. In this 9-timeslot example, the fractional payload field is 45 bytes in length. In another example, 7 fractional T1 payloads with 6 timeslots are inserted into the fractional payload field. In this 6-timeslot example, the fractional T1 payload field is 42 bytes in length.

In step 708, T1 frame bits, corresponding to the fractional T1 payloads of step 705, are inserted into the frame bit field of the ATM cell. The frame bit field is two bytes in length and comprises one T1 frame bit for each fractional T1 payload inserted into the fractional payload field. The 2-byte capacity of the frame bit field may not be fully utilized because of the variation in the number of fractional T1 payloads carried in the fractional payload field. Any unused bits are set a logic "0" at "front-end" (closest to ATM cell header) of the frame bit field, followed by a logic "1" that identifies the beginning of the T1 frame bits.

Next in step 711, a checksum field is created in the payload of the ATM cell. The checksum field detects bit errors in the frame bit field caused by the physical line during ATM cell transmission. In one embodiment, the checksum field is a 1-byte Cyclic Redundancy Check (CRC-8).

Next in step 714, a variable length spare byte field is created in the payload of the ATM cell. The spare byte field is filled with logic "0"s and varies between 0–3 bytes in length. The spare byte field offsets changes in the length of the fractional payload field so that the combined length of the fractional payload field and the spare byte field is 45 bytes. Thus, step 714 is only necessary when the fractional payload field is less than 45 bytes in length. In the 9-timeslot example discussed above, the spare byte field is non-existent because the fractional payload field is 45-bytes. But, in the 6-timeslot example discussed above, the spare byte field is 3 bytes in length because the fractional payload field is only 42-bytes.

In step 717, the ATM cell is sent over an ATM network to a destination $DTE_2$, such as DTE 110 in FIG. 1. This requires that the ATM cell be carried by an ATM bearing physical signal. SONET is one physical standard designed for high speed optical communications that supports ATM communications. ATM cells are loaded in SONET frames and transmitted over optical fiber to a destination $DTE_2$. The present invention is not limited to use with a SONET carrier signal. Any carrier signal that will support signal traffic can be used to carry ATM cells according to the present invention.

In step 720, the ATM cell carrying the fractional T1 frames is received at $DTE_2$, such as DTE 110 in FIG. 1. In step 723, the overhead portion of the ATM cell is processed. Overhead processing includes reading the T1 frame bits in the frame bit field and reading the HDLC timeslot for each of the fractional T1 payloads carried in the fractional payload field.

One advantage of the present invention is that the overhead portion of each ATM cell can be processed without a preliminary step of synchronizing the fractional T1 frames, also known as T1 framing. This is possible because position of the 2-byte frame bit field is constant over successive ATM cells. In one embodiment, the frame bit field is the $51^{st}$ and $52^{nd}$ bytes of a 53-byte ATM cell. If a frame bit field contains unused capacity, then the unused bits are set to a logic "0" and a logic "1" identifies the beginning of the T1 frame bits (or some other flag could be used identify the beginning of the T1 frame bits). Also, the HDLC timeslot positions are easily determined because the fractional payload field contains an integer number of fractional payloads, and the HDLC timeslot is the last timeslot in each fractional payload. Thus, the HDLC timeslot positions can easily be determined from the end of the standard 5-byte ATM cell header.

In conventional fractional T1 emulation, the T1 frame bits are carried in the ATM cell payload, attached to their corresponding fractional T1 payloads. As discussed earlier, this results in each ATM cell carrying a non-integer number of fractional T1 frames, which causes the T1 frame bit position(s) and every timeslot position to vary over successive ATM cells. Thus in conventional fractional T1 emulation, a T1 framer must synchronize a plurality of fractional T1 frames to identify the T1 frame bit position(s) before either the T1 frame bit(s) or the HDLC timeslot(s) can be read. Once T1 framing is complete, the T1 frame bit position(s) are known and the HDLC timeslot position(s) can be determined.

T1 framing is time consuming and requires complicated hardware. The present invention avoids the T1 framing step because all the T1 frame bits for an ATM cell are carried together in the frame bit field. Thus, the T1 frame bits are located in fixed bit positions over successive ATM cells, which eliminates the need for T1 framing.

The present invention also provides several other benefits to the user. Among them, a single ATM port card attached to a switch matrix 1150 can communicate concurrently with a plurality of other, remote switches, if each also contains an implementation of this invention. (An ATM port card comprises ATM transmitter 1175, ATM receiver 1110, SONET transmitter 1185, and SONET receiver 1105.) A separate port card is not needed to communicate with each remote switch.

Another benefit is that the number of timeslots carried in the ATM cells concurrently received from each of the remote switches the port card is connected to can vary from one switch to another. This allows the port card to groom the number of active channels in an ATM cell to minimize ATM traffic. If the implementation of the port card has a limited number of timeslots to the switch matrix, the port card can manage the connection from a timeslot to a particular switch such that the timeslot will vary from remote switch to remote switch as call loads vary. This would allow each remote switch connected to the port card to assume it had a large reserve of unused connections to the port card with which it would make calls.

For example, in one embodiment, the port card has 24 timeslots to the switch matrix 1150. It would be logically connected to four remote switches. With the ability to carry up to 23 voice timeslots and an HDLC channel in a single T1, this would result in 92 total voice timeslots between the remote switches and the port card. Only the timeslots actually carrying a conversation will be connected to one of the 24 timeslots to the switch matrix 1150. When a connection is needed to any of the remote switches, the port card would assign an unused timeslot to the switch matrix 1150 and an unused timeslot in the fractional, quasi-fractional, or full T1 channel to the remote switch, in each direction, to the connection. Using the HDLC channel it would inform the remote switch of the new connection. If there are no unused timeslots in the fractional or quasi-fractional T1, the port card would communicate with it's peer port card on the remote switch to change the fractional or quasi-fractional allocation to increase the number of timeslots per T1 frame, then utilize one of the newly created unused timeslots for the connection. This increased allocation results in more cells per second being transmitted between the port card and the remote switch.

Once a connection is terminated, the port card would assign as unused the switch matrix 1150 timeslot and the timeslot in the T1 connection to the remote switch. If sufficient unused timeslots between the port card and the remote switch exist, the port card will arrange with it's remote peer to reduce the number of available timeslots in the fractional or quasi-fractional T1. This will results in fewer cells per second being transmitted between the port card and the remote switch.

Because of statistical multiplexing, the sum total of all potential voice channels between the port card and all of the remote switches can exceed the total number of timeslots available to port card through the switch matrix 1150. In a properly managed network it would be extremely rare when all timeslots to the switch matrix 1150 are used. In those cases where it happens with sufficient frequency to affect the quality of service, the network administrator would investigate how to go about assigning more timeslots from the switch matrix 1150 to the port card, install an additional port card, or replace port card with a design that can make more connections to the switch matrix 1150.

B. ATM Cell Structure for Carrying Fractional T1 Frames

FIG. 8A illustrates the structure of an ATM cell used to carry fractional T1 frames according to one embodiment of the present invention. FIG. 8B is a table that illustrates the maximum number of fractional T1 frames that can be carried in an ATM cell verses the size (in timeslots) of the fractional T1 payload for several example configurations according to the present invention. FIG. 8B also identifies the method of frame bit encapsulation and the spare byte field size. Quasi-fractional T1 and T1 information are include for comparison purposes.

In FIG. 8A, ATM cell 400 comprises ATM header 405 and ATM payload 410. ATM header 405 is the standard 5-byte ATM header; i.e., no frame bits replace ATM header bits for purely fractional T1 frames as is for T1 frames or quasi-fractional T1 frames. The 48-byte ATM payload 410 is structured to include: spare byte field 820, fractional payload field 830, frame bit field 840, and checksum field 850.

Spare byte field 820 is filled with logic "0"s that are ignored by the destination $DTE_2$. Spare byte field 820 offsets changes in the length of fractional payload field 830 such that the combined length of fractional payload field 830 and spare byte field 820 is a constant 45-bytes. The length of spare byte field 820 varies between 0–3 bytes because the length of fractional payload field 830 varies between 42–45 bytes.

Fractional payload field 830 carries the fractional payloads from one or more fractional T1 frames. The length of the fractional payload field varies from 42–45 bytes, depending on the number timeslots in the fractional payloads. FIG. 8B is a table that illustrates the number of [fractional] payloads per ATM cell verses the number of timeslots per [fractional] payload. For example, 7 fractional T1 payloads with 6 timeslots can be carried in fractional payload field 830. This example also requires a 3-byte spare byte field as indicated by the spare byte column. FIG. 8B is not exhaustive, there may be other combinations of payload size not expressly illustrated in FIG. 8B.

FIG. 8B also includes the number of quasi-fractional T1 payloads and standard T1 payloads that can be loaded into an ATM cell for comparison purposes. One distinction being that the T1 flame bits are encapsulated in the ATM cell header for T1 and quasi-fractional T1 emulation. Whereas, the T1 frame bits for fractional T1 are carried in the ATM cell payload for fractional T1 frames, as illustrated by the encapsulation column in FIG. 8B.

Frame bit field 840 is a 2-byte field that carries one T1 frame bit for each fractional payload inserted into the fractional payload field 830. The 2-byte capacity of the frame bit field may not be fully utilized because of the variation in the number of fractional payloads carried in fractional payload field 830. Any unused bits are set to logic "0" at the "front end" (closest to the ATM cell header), followed by a logic "1" that identifies the beginning of the T1 frame bits.

Checksum field 850 detects bit errors in the frame bit field 840 caused by the physical line during transmission. In one embodiment, checksum field 850 is a 1-byte Cylic Redundancy Check (CRC-8).

VIII. Single, Dual, and Multiple T1 Source Operation

ATM cells may carry T1 frames over ATM network 101 from a single T1 source or a multiple T1 sources. For illustrative purposes, single and dual source operation will be discussed. FIGS. 9A and 9B illustrate single and dual T1 source operation, respectively.

In single T1 source operation, ATM cell 400 carries T1 payloads #1 and #2 from a single ESF 310a as shown in FIG. 9A. The ATM cell that follows will carry T1 payloads #3 and #4 from ESF 310a The third ATM cell will carry T1 payloads #5 and #6.

In dual T1 source operation, ATM cell 400 carries T1 payload #1 from ESF 310a and T1 payload #1 from ESF 310b, as shown in FIG. 9B. ESF 310a and ESF 310b originate from two distinct T1 sources. The ATM cell that follows will carry T1 payload #2 from ESF 310a and T1 payload #2 from ESF 310b.

An advantage of dual source operation is that a single ATM cell can support 48 DS0 channels compared with 24 DS0 channels for single source operation. The disadvantage is the cell rate during dual source operation may have to be doubled compared to single source operation.

Single and dual source operation are but one embodiment. Given this description, those skilled in the art will recognize that multiple T1 sources may be carried over ATM network 101. If the sources are fractional T1 sources, then fractional payload field 830 can support multiple fractional T1 sources.

IX. Loading T1 Payloads Into ATM Cells

Figure 10:
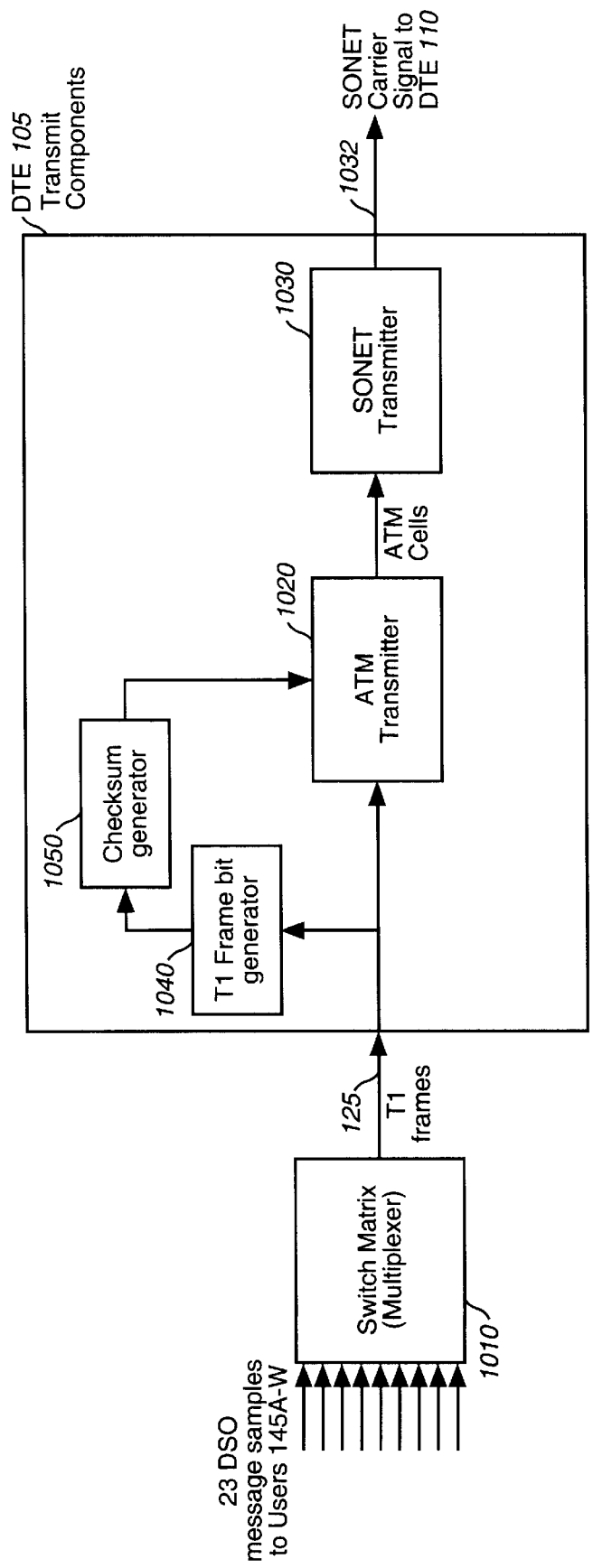
FIG. 10 is a block diagram that illustrates the DTE components that construct and transmit ATM cells according to the present invention.

FIG. 10 is functional block diagram illustrating the components of DTE 105 that load T1 frames into ATM cells and transmit the ATM cells over ATM network 101. FIG. 10 includes switch matrix 1010, and DTE 105 cell transmit components. DTE 105 cell transmit components include: ATM transmitter 1020, SONET transmitter 1030, frame bit generator 1040, and checksum generator 1050.

Switch matrix 1010 forms a stream of T1 frames on line 125 by multiplexing message samples from Users 140A–W. T1 line 125 terminates at ATM DTE 105.

ATM transmitter 1020 constructs ATM cells using T1 frames on line 125. ATM transmitter 1020 selects two consecutive T1 frames and constructs each ATM cell as illustrated in FIGS. 5 and 6. To do so, ATM transmitter 1020 removes frame bits 651 and 661 from each T1 frame and places them in the least significant bit positions of the VCI field 425. ATM transmitter 1020 fills in the remaining bits of the VCI field 425 and VPI field 420 with the destination DTE address. ATM transmitter 1020 fills in payload type field 430 with the appropriate bits, and fills the GFC field 415 and CLP field 435 with all zero bits. Finally, ATM transmitter 1020 fills the HEC field 440 with the correct CRC (error check) based upon the contents of the other bits of cell header 405.

The actual means used by ATM transmitter 1020 to load T1 payloads and frame bits into an ATM cell is readily apparent to someone skilled in the art in view of FIGS. 5–10, and the related discussion in this Application. Thus, it need not be described in further detail here.

ATM transmitter 1020 then sends the ATM cells to SONET transmitter 1030. SONET transmitter 1030 packages ATM cells in SONET frames and creates SONET signal 1032. SONET transmitter 1030 sends SONET signal 1032 to DTE 110 over ATM network 101. SONET is a family of physical line standards used with high speed fiber optic links, and is often used to transport ATM cells. Packaging ATM cells in SONET frames and forming SONET signal 1032 is well known to those skilled in the art and need not be described further. ATM transmitter 1020 may contain a storage buffer for storing ATM cells prior to being sent to SONET transmitter 1030. In the alternative, SONET transmitter 1030 may contain the storage buffer.

The present invention is not limited to use with fiber optic links implementing the SONET communications protocol. SONET is only one example of a physical line protocol used to carry ATM cells. Those skilled in the art will recognize that multiple physical links operating different physical protocols could be used to carry ATM cells according to the present invention. These include twinlead wire lines, and wireless satellite links operating well known physical link protocols such as T3, ½ SONET, RS-232, HISSI, FIREWIRE, etc.

As discussed earlier, carrying T1 frame bits in the ATM cell header is but one embodiment of the present invention. When T1 line 125 is carrying fractional T1 frames, ATM transmitter 1020 constructs ATM cells with the cell structure illustrated in FIGS. 7, 8A, and 8B. To this end, frame bit generator 1040 reads T1 frame bits for the fractional T1 frames and sends the frame bits to checksum generator 1050. Checksum generator 1050 formulates a 1-byte checksum field for each ATM cell to detect bit errors in the frame bit field caused by the physical line during cell transmission. Checksum generator 1050 sends the checksum field to ATM transmitter 1020 for insertion into the ATM cell payload. For fractional T1, ATM transmitter 1020 collects between 42 and 45 timeslots of used T1 channels until ATM transmitter 1020 has collected a whole number of fractional T1 frames. ATM transmitter 1020 places the timeslots, in the order received, in fractional payload field 830 of FIG. 8*a*. If whole number of collected fractional frames is less than 45 bytes, ATM transmitter 1020 fills the spare byte field 820 so that the sum of payload field 830 and spare byte field 820 is always 45 bytes. The contents of the spare byte field 820 is irrelevant as the spare byte field is ignored by the destination DTE when processing the ATM cell.

ATM transmitter 1020 inserts the frame bits associated with the fractional frames in frame bit field 840, which is 16 bits long. Unused locations within frame bit field 840 are filled with "0" bits followed by logic "1" that identifies the beginning of the T1 frame bits. Last, ATM generator 1020 inserts the checksum from checksum generator 1050 and places this in checksum field 850. The checksum stored in checksum field 850 is capable of correcting any single bit error in frame bit field 840 or itself.

X. Unloading T1 Payloads from ATM Cells

Figure 11:
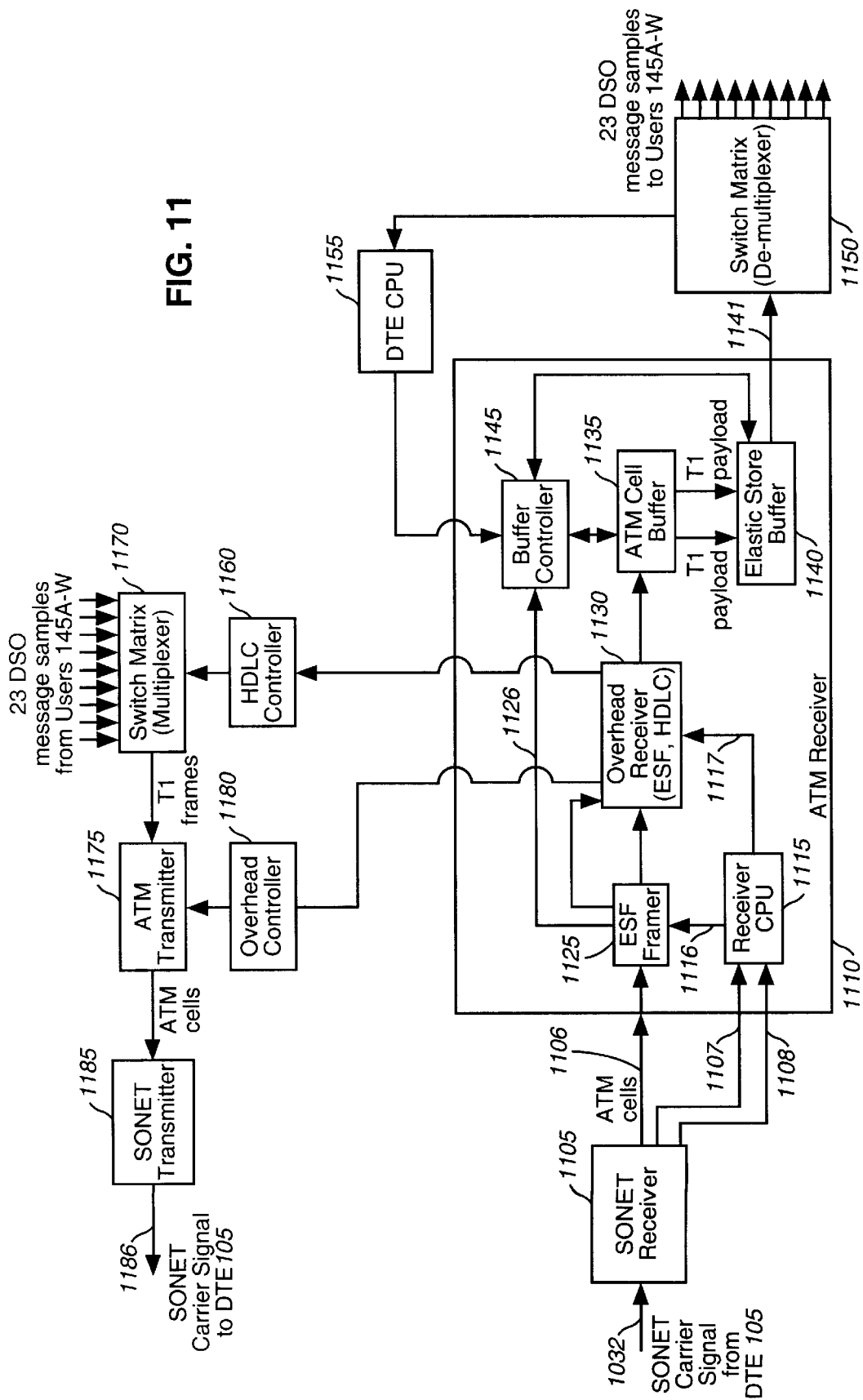
FIG. 11 is a block diagram that illustrates complete DTE operation.
Figure 12:
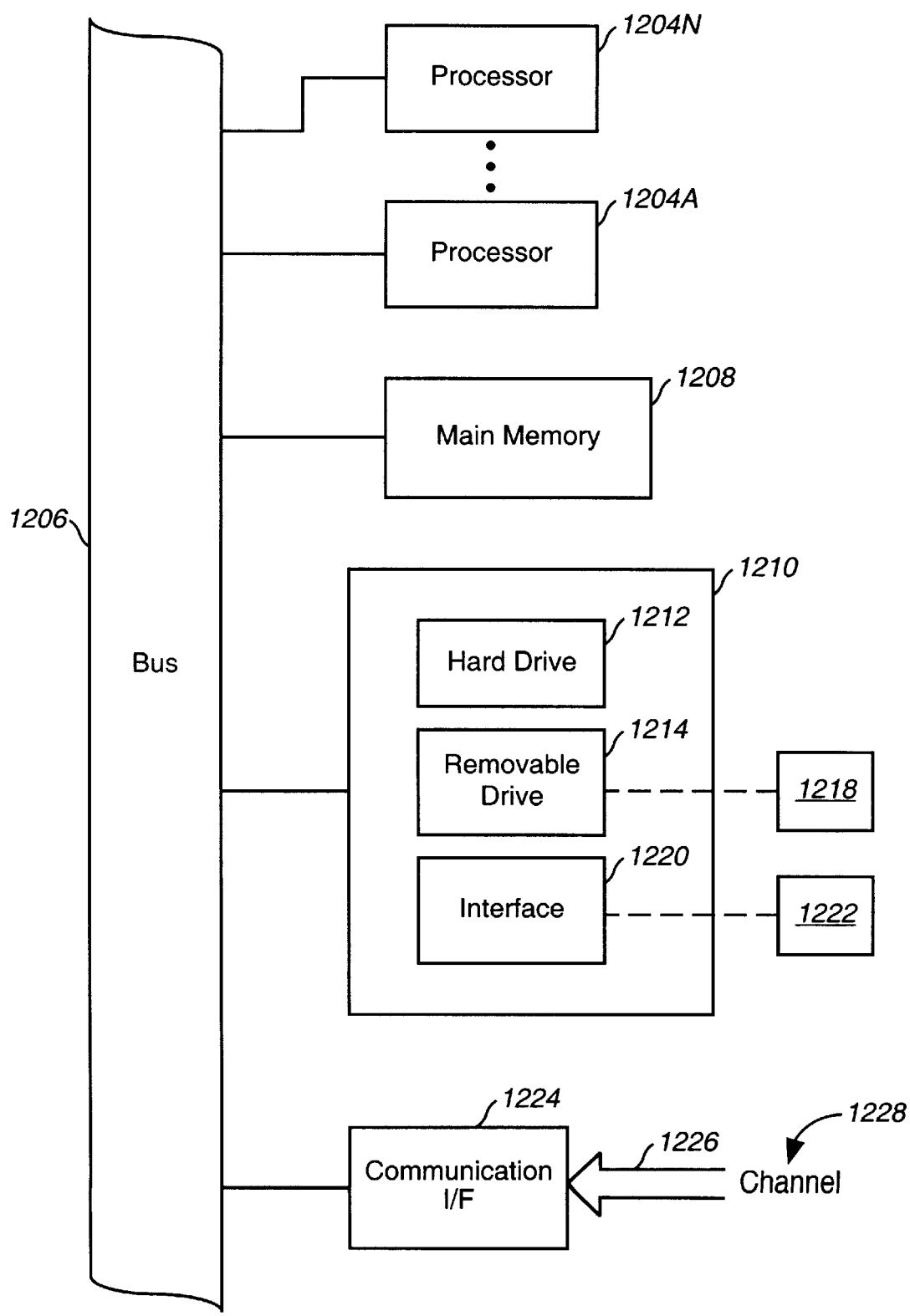
FIG. 12 is a block diagram of a computer implementation of the invention.

FIG. 11 is a block diagram of the components used to process the ATM cells at DTE 110. DTE 110 has full duplex capability, meaning DTE 110 can transmit and receive ATM cells simultaneously. DTE 110 receive components include: SONET receiver 1105, ATM receiver 1110, switch matrix 1150, and DTE CPU 1155. ATM receiver 1110 includes: ESF framer 1125, overhead receiver 1130, receiver CPU 1115, buffer controller 1145, cell buffer 1135, and elastic store buffer 1140. DTE transmit components include: switch matrix 1170, ATM transmitter 1175, HDLC controller 1160, overhead controller 1180, and SONET transmitter 1185.

In one embodiment of the present invention, ATM cells arrive at DTE 110 embedded in a SONET signal 1032.

SONET receiver 1105 receives SONET signal 1032 from DTE 105. SONET receiver 1105 unloads the ATM cells from the SONET frames. SONET receiver 1105 sends the unloaded ATM cells to ATM receiver 1110 on line 1106 at bit rate $r_1$. SONET receiver 1105 also generates cell start signal 1107 and clock signal 1108, which are sent to receiver CPU 1115. Cell start signal 1107 alerts receiver CPU 1115 that an ATM cell has been unloaded from the SONET signal. Clock signal 1108 informs receiver CPU 1115 of the incoming ATM cell bit rate $r_1$. Unloading ATM cells from the SONET signal and generating control signals 1107 and 1108 are well known to those skilled in the art and do not need to be described in further detail.

Receiver CPU 1115 determines the arrival time of each ATM cell based on control signals 1107 and 1108. Receiver CPU 1115 sends enablement signal 1116 to data framer 1125 to signal the arrival of each ATM cell. Similarly, CPU 1115 sends enablement signal 1117 to overhead receiver 1130. Data framer 1125 forwards the control information to buffer controller 1145 on line 1126, along with ESF synchronization information as will be discussed below.

ESF framer 1125 receives the ATM cells at a bit rate $r_1$. In one embodiment, the T1 frames carried in the ATM cells are in an Extended Superframe Format (ESF). ESF framer 1125 does the ESF synchronization on the T1 frames carried in the initial ATM cells which are unloaded from a new SONET frame. This amounts to finding T1 frame #1 in FIG. 3. This is necessary because the first ATM cell may not start with T1 frame #1. It is necessary to find a T1 frame #1 in the initial ESFs in order for the overhead receiver 1130 to effectively utilize the ESF frame bit section 305 in the following ESFs. Overhead receiver 1130 typically cannot distinguish the three types of ESF frame bits ("S,C,F") until data framer 1125 has completed ESF synchronization.

ESF synchronization is made much easier in the present invention because an integer number of T1 frames are contained within each ATM cell. ESF framer 1125 knows exactly where to look in each ATM cell for the ESF frame bits, since the ESF frame bits are in a fixed bit position over successive ATM cells. In one embodiment, the ESF frame bits replace the least significant bits in the VCI field of each ATM cell header. In another embodiment, where the T1 frames are fractional T1 frames, the ESF frame bits are located in the frame bit field of each ATM cell payload.

ESF synchronization is performed by looking for a distinct pattern of ESF synchronization frame bits ("S" bits in frame bit section 305 in FIG. 3). Once the pattern is found, T1 frame #1 can be located. ESF framer 1125 sends the synchronization information to overhead controller 1130 and to buffer controller 1145. ESF Framer 1125 also forwards control information (cell start signal 1107 and clock signal 1108) to buffer controller 1145 on line 626.

Next the ATM cells are sent to overhead receiver 1130 at a bit rate $r_1$. Upon receiving enablement signal 1117, overhead receiver 1130 reads and stores an entire ESF frame, comprising an ESF frame bit section and an ESF payload. When an entire ESF frame has been read and stored, overhead receiver 1130 does the CRC-6 error check on the ESF frame. The CRC-6 error check detects bit errors in the ESF frame that are caused by physical line errors during transmission. Overhead receiver 630 sends the CRC-6 error check results to the overhead controller 1180.

Overhead controller 1180 keeps track of the number of CRC test failures. If a threshold is met, then overhead controller 1180 formulates a status message to be sent to network administrator 102. Overhead controller 1180 instructs ATM transmitter 1175 to insert the status message in the DL channel of the outgoing ESF(s). It takes several ESFs to carry the status message since only 12 of 24 ESF frame bits are devoted to the DL channel. Upon receipt of the status message, network administrator 102 may perform restoration or dispatch a technician to inspect the physical lines in ATM network 101.

Overhead receiver 1130 also reads any HDLC message carried in the HDLC channel of the ESF frame. The HDLC channel is carried by timeslot #24 of each T1 frame. As discussed earlier, the HDLC channel carries link management messages for use by the DTEs. Examples of these link management messages are call setup and call tear-down. Overhead receiver 1130 sends any received HDLC messages to HDLC controller 1160. HDLC controller 1160 analyzes the HDLC message and formulates a response, if necessary. HDLC controller 1160 sends the HDLC response to switch matrix 1170 so that the HDLC response can be multiplexed into the outgoing T1 frames.

Next the ATM cells are sent to cell buffer 1135. Cell buffer 1135, elastic store buffer 1140, buffer controller 1145, and DTE CPU 1155 operate to unload the T1 payloads from the ATM cells. Elastic store buffer 1140 sends the unloaded T1 payloads to switch matrix 1150 at a bit rate $r_2$, where $r_2$ is set by switch matrix 1150. This is done by switch matrix 1150 communicating $r_2$ to DTE CPU 1155. Then, DTE CPU 1155 notifies buffer controller 1145 of the $r_2$ requirement. Buffer controller 1145 programs a shift register (not shown) in elastic store buffer 1140 to operate at $r_2$.

Cell buffer 1135 stores the incoming ATM cells at bit rate $r_1$. The ATM cells are stored from the bottom of cell buffer 1135 to the top. Buffer controller 1145 monitors the cell level in cell buffer 1135, where the cell level is a percentage of the total storage capacity. When the cell level reaches a nominal level, buffer controller 1145 initiates the transfer of T1 payloads to elastic store buffer 1140.

Buffer controller 1145 initiates the transfer of T1 payloads by selecting the ATM cell at the bottom of cell buffer 1135.

The selected cell is identified as the target ATM cell for clarity. Buffer controller 1145 transfers the two T1 payloads in parallel from the target ATM cell to elastic store buffer 1140. Once the transfer is complete, the target ATM cell is deleted. When this occurs, a new ATM cell becomes the bottom ATM cell in cell buffer 1135.

Elastic store buffer 1140 sends the two transferred T1 payloads to switch matrix 1150. In one embodiment, elastic store buffer 1140 contains a shift register (not shown). The shift register shifts the two T1 payloads out in one-byte increments (or one timeslot increments) on line 1141. (There are 24 timeslots in each T1 payload.) The shift register sends timeslots 1141 to switch matrix 1150 at bit rate $r_2$. After the elastic store buffer 1140 has cleared, buffer controller 1145 selects next target ATM cell and the process is repeated.

Generally, incoming ATM cells arrive at a bit rate $r_1$ that is asynchronous with the bit rate $r_2$ that T1 payloads are demanded by switch matrix 1150. This results in the need for the two buffers. Cell buffer 1135 stores the incoming ATM cells at bit rate $r_1$, and elastic store buffer 1140 sends timeslots 1141 to switch matrix 1150 at a bit rate $r_2$. Buffer controller 1145 controls the transfer of T1 payloads from cell buffer 1135 to elastic store buffer 1140.

Sending exactly two T1 payloads in parallel from cell buffer 1135 to elastic store buffer 1140 is but one embodiment. When ATM network 101 is emulating a fractional T1 link, the incoming ATM cells may carry greater than two T1 frames because the T1 payloads may consists of less than 24 timeslots. In this case, the number of T1 payloads sent between the cell buffer 1135 and the elastic store buffer 1140 may be an integer number greater than two. In another alternative embodiment, the T1 payloads are transferred in a serial manner, instead of a parallel manner.

Switch matrix 1150 receives the timeslots 1141 at bit rate $r_2$. Switch matrix 1150 de-multiplexes all 24 timeslots (or 23 of the 24 timeslots if the $24^{th}$ timeslot is used for the HDLC channel) in each T1 payload and sends them to their respective Users 145A–W. It is useful to recall that a T1 link carries 8000 T1 frames/sec. Thus, each timeslot in a T1 frame carries only a small sample of the voice or data message destined for Users 145A–W. The $24^{th}$ timeslot in each T1 payload is the HDLC timeslot. The HDLC timeslot is used by DTE 105 and DTE 110 to communicate link management messages.

During transmission, switch matrix 1170 forms outgoing T1 frames by multiplexing voice or data message samples that Users 145A–145W want to send to Users 140A–140W. Switch matrix 1170 sends the outgoing T1 frames to ATM transmitter 1175.

ATM transmitter 1175 forms outgoing ATM cells by packaging T1 frames in ATM cells as illustrated by FIGS. 5 and 6. As discussed earlier, each ATM cell payload typically carries two T1 payloads. The frame bit for each T1 payload replaces a bit in the ATM cell header. If the T1 frames are in the ESF format, overhead controller 1180 may submit an overhead status message to ATM transmitter 1175. ATM transmitter 1175 inserts the overhead status message in the DL channel of the outgoing ESF frame bits carried in the ATM cell header. ATM transmitter 1175 sends the outgoing ATM cells to SONET transmitter 1185.

Packaging two T1 frames in each ATM cell is but one embodiment. If the emulated T1 link is a fractional T1 link, then an integer number of fractional T1 frames other than two may be carried in each ATM cell. As illustrated by FIG. 8A, the T1 frame bits of fractional T1 frames are carried in the frame bit field in each ATM cell payload, instead of the ATM cell header.

SONET transmitter 1185 forms SONET signal 1186 by packaging outgoing ATM cells inside SONET frames. SONET transmitter 1185 sends SONET signal 1186 to DTE 105 over ATM network 101. Packaging ATM cells in SONET frames and forming SONET signal 1186 are well known to those skilled in the art and need not be described in further detail.

The present invention is not limited to use with fiber optic links implementing the SONET communications protocol. SONET is only one example of a physical line protocol used to carry ATM cells. Those skilled in the art will recognize that multiple physical links operating different physical protocols could be used to carry ATM cells according to the present invention. These include twinlead wire lines, and wireless satellite links operating well known physical link protocols such as T3, ½ SONET, RS232, HSSI, FIREWIRE, etc.

XI. E1 Emulation

The present invention has been described in the environment of ATM network that is emulating a T1 link. Those skilled in the art will recognize that the invention is also useful in the environment of an ATM network emulating an E1 link. E1 is a European time domain multiplexed (TDM) communications standard that is very similar to T1. The difference is that an E1 link may carry 30 distinct voice grade channels, a framing channel, and a signaling channel for a transmission rate of 2.048 Mbps, whereas a T1 link may carry 24 distinct voice grade channels for a transmission rate of 1.544 Mbps. An E1 link transmits 8000 frames/sec just as a T1 link does.

An E1 frame carries 32 DS0 timeslots in a E1 payload, whereas a T1 frame carries 24 DS0 timeslots in a T1 payload. In an E1 frame, the HDLC timeslot replaces the signaling channel in the $1^{st}$ timeslot in the E1 payload. When the invention is practiced in the environment of an ATM network emulating an E1 link, only one E1 frame is carried in each ATM cell.

The present invention has been described with respect to emulating a T1 or E1 link, however, the present invention is not so limited. As would be apparent to a person skilled in the art, the present invention can be used in any packet or cell-based network emulating any synchronous or asynchronous digital transmission link. This includes any current or future ATM-based network emulating a T1 link, E1 link, or proprietary link that is carrying any type of data on any number of channels.

XII. Computer Implementation of the Invention

The subject invention has been described above with the aid of functional building blocks illustrating the performance of specified functions and relationships thereof. The boundaries of these functional building blocks have been defined partly for the convenience of the description. Alternate boundaries may be defined so long as the specified functions and relationships thereof are appropriately performed. Any such alternate boundaries are thus within the scope and spirit of the claimed invention. These functional building blocks may be implemented by discrete components, application specific integrated circuits, processors executing appropriate software, and the like or any combination thereof. It is well within the scope of a person with ordinary skill in the art to develop the appropriate circuitry and/or software to implement these functional building blocks.

In one embodiment, the invention, including ATM transmitter 1020 and ATM receiver 1110, is directed toward a software and/or hardware embodiment in a computer system. An example computer system 1202 is shown in FIG.

12. The computer system 1202 includes one or more processors, such as processors 1204A–N. The processors 1204A–N are connected to a communication bus 1206. Various software embodiments are described in terms of this example computer system. After reading this description, it will become apparent to a person skilled in the relevant art how to implement the invention using other computer systems and/or computer architectures.

Computer system 1202 also includes a main memory 1208, preferably random access memory (RAM), and can also include a secondary memory or secondary storage 1212. The secondary memory 1210 can include, for example, a hard disk drive 1212 and a removable storage drive 1214, representing a floppy disk drive, a magnetic tape drive, an optical disk drive, etc. The removable storage drive 1214 reads from and/or writes to a removable storage unit 1218 in a well known manner. Removable storage unit 1218, represents a floppy disk, magnetic tape, optical disk, etc. which is read by and written to by removable storage drive 1214. As will be appreciated, the removable storage unit 1218 includes a computer usable storage medium having stored therein computer software and data.

In alternative embodiments, secondary memory 1210 may include other similar means for allowing computer software and data to be loaded into computer system 1202. Such means can include, for example, a removable storage unit 1222 and an interface 1220. Examples of such can include a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1218 to computer system 1202.

Computer system 1202 can also include a communications interface 1224. Communications interface 1224 allows software and data to be transferred between computer system 1202 and external devices. Examples of communications interface 1224 can include a modem, a network interface (such as an Ethernet card), a communications port, a PCMCIA slot and card, etc. Software and data transferred via communications interface 1224 are in the form of signals 1226 which can be electronic, electromagnetic, optical or other signals capable of being received by communications interface 1224. These signals 1226 are provided to communications interface via a channel 1228. This channel 1228 carries signals 1226 and can be implemented using wire or cable, fiber optics, a phone line, a cellular phone link, an RF link and other communications channels.

In this document, the terms "computer program medium" and "computer usable medium" are used to generally refer to media such as removable storage device 1218, a hard disk installed in hard disk drive 1212, and signals 1226. These computer program products are means for providing software (e.g., computer programs) to computer system 1202.

Computer programs (also called computer program logic) are generally stored in main memory 1208 and/or secondary memory 1210 and executed therefrom. Computer programs can also be received via communications interface 1224. Such computer programs, when executed, enable the computer system 1202 to perform the features of the present invention as discussed herein. In particular, the computer programs, when executed, enable the processor 1204 to perform the features of the present invention. Accordingly, such computer programs represent controllers of the computer system 1202.

In an embodiment where the invention is implemented using software, the software may be stored in a computer program product and loaded into computer system 1202 using removable storage drive 1214, hard drive 1212 or communications interface 1224. The computer control logic (software), when executed by the processor 1204, causes the processor 1204 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

XIII. Conclusion

While various embodiments of the present invention have been described above, it should be understood that they have been presented in a way of example only, and not limitation. It will be understood by those skilled in the art that the various changes in form and details may be made therein without departing from the spirit and scope of the present invention as defined in the appended claims. Thus, the breadth and scope of the present invention should not be limited by any of the above-described exemplary embodiments, but should be defined only in accordance with the following claims and their equivalents.

What is claimed is:

1. A method of loading one or more T1 or more T1 frames from a T1 link into an Asynchronous Transfer Mode (ATM) cell, said one or more T1 frames being in Extended Superframe (ESF) Format, wherein the ATM cell comprises an ATM cell header and an ATM cell payload, comprising the steps of:

inserting one or more T1 payloads from respective one or more T1 frames into the ATM cell payload; and replacing one or more header bits in the ATM cell header with one or more T1 frame bits from the respective one or more T1 frames, whereby the ATM cell travels oven an ATM network, whereby the ATM network emulates the T1 link.

2. The method of claim 1, wherein the one or more T1 frames comprises two T1 frames;

wherein said step of inserting one or more T1 payloads comprises inserting two T1 payloads from two respective T1 frames into the ATM cell payload; and wherein said step of replacing one or more header bits comprises replacing two header bits in the ATM cell header with two T1 frame bits from the two respective T1 frames.

3. The method of claim 1, wherein said step of replacing one or more header bits comprises replacing one or more least significant bits in a virtual channel indicator (VCI) field of the ATM cell header with one or more T1 frame bits from the respective one or more T1 frames.

4. The method of claim 1, wherein the T1 frames are quasi-fractional T1 frames from a quasi-fractional T1 link;

wherein said step of inserting one or more T1 payloads comprises inserting one or more quasi-fractional T1 payloads from respective quasi-fractional T1 frames into an ATM cell payload; wherein each quasi-fractional T1 payload comprises one of 12 timeslots or 16 timeslots.

5. The method of claim 1, further comprising:

sending the ATM cell over the ATM network to a destination Data Terminating Equipment (DTE);

receiving the ATM cell at the destination DTE;

processing a overhead portion of the ATM cell;
unloading the one or more T1 payloads from the ATM cell payload; and
de-multiplexing the one or more T1 payloads at a switch matrix.

6. The method of claim 5, wherein said step of processing a overhead portion comprises the steps of:
reading the one or more T1 frame bits in an ATM cell header; and
reading the HDLC timeslot for each of the one or more T1 payloads.

7. The method of claim 6, wherein the one or more T1 frame bits are Extended Superframe Format (ESF) frame bits, further comprising the steps of:
synchronizing a plurality of ESF frames, wherein each ESF frame includes an ESF frame bit section and a ESF payload section;
reading an ESF flame; and
checking the ESF frame for a bit error.

8. The method of claim 6, wherein an HDLC message is carried in the HDLC timeslot over a plurality of ATM cells, further comprising the steps of:
analyzing the HDLC message; and
transmitting a response based on the HDLC message.

9. A method of loading one or more fractional T1 frames from a fractional T1 link into an Asynchronous Transfer Mode (ATM) cell, said one or more fractional T1 frames being in Extended Superframe (ESF) format, wherein the ATM cell comprises an ATM cell header and an ATM cell payload, comprising the steps of:
inserting one or more fractional T1 payloads from respective one or more fractional T1 frames into a fractional payload field of the ATM cell payload; and
inserting one or more T1 frame bits from the respective one or more fractional T1 frames into a frame bit field of the ATM payload,
whereby the ATM cell travels over an ATM network, whereby the ATM network emulates the fractional T1 link.

10. The method of claim 9, wherein the frame bit field has a n-byte capacity, wherein said step of inserting one or more T1 frame bits comprises the steps of:
loading each of the one or more T1 frame bits sequentially into the frame bit field; and
if one or more T1 frame bits do not fill the n-byte capacity, then filling the n-byte capacity of the frame bit field with a plurality of logic "0"s followed by a logic "1", said plurality of "0"s being closest to said ATM cell header, until the n-byte capacity of the frame bit field is filled.

11. The method of claim 10, wherein the n-byte capacity is 2-bytes.

12. The method of claim 9, further comprising the step of:
creating a checksum field in the ATM cell payload to detect bit errors in the frame bit field that are caused by a physical line during transmission.

13. The method of claim 12, further comprising the step of:
creating a spare byte field to fill up the ATM cell payload when the fractional payload field, frame bit field, and checksum field do not fully occupy the ATM cell payload; wherein the spare byte field has a variable length as necessary to fill up the ATM cell payload.

14. The method of claim 9, further comprising the steps of:

sending the ATM cell over the ATM network to a destination Data Terminating Equipment;
receiving the ATM cell at the destination DTE;
processing a overhead portion of the ATM cell;
unloading the one or more T1 payloads from the ATM cell; and
de-multiplexing the one or more T1 payloads at a switch matrix.

15. The method of claim 14, wherein said step of processing the overhead portion comprises the steps of:
reading the one or more T1 frame bits in the ATM cell header; and
reading the HDLC timeslot.

16. The method of claim 15, wherein the one or more T1 frame bits are Extended Superframe (ESF) frame bits, further comprising the steps of:
synchronizing a plurality of ESF frames, wherein each ESF frame includes an ESF frame bit section and a ESF payload section;
reading a ESF frame; and
checking the ESF frame bit section for a bit error.

17. The method of claim 15, wherein an HDLC message is carried in the HDLC timeslot over a plurality of ATM cells, further comprising the steps of:
analyzing the HDLC message; and
transmitting a response based on the HDLC message.

18. An ATM cell embodied in a carrier signal, to carry one or more T1 frames from a first Data Terminating Equipment (DTE) over an ATM network to a second DTE, said one or more T1 frames being in Extended Superframe (ESF) format the ATM cell comprising:
an ATM cell payload, comprising one or more T1 payloads from respective one or more T1 frames; and
an ATM cell header, comprising a plurality of control fields used by the ATM network to route the ATM cell second DTE, further comprising one or more T1 frame bits from the respective one or more T1 frames, wherein each T1 frame bit replaces a bit in one of said control fields.

19. The ATM cell of claim 18, wherein said one or more T1 frames is two T1 frames, wherein said one or more T1 payloads is two T1 payloads, wherein said one or more T1 frame bits is two T1 frame bits.

20. The ATM cell of claim 18, wherein said one or more T1 frame bits replace one or more least significant bits in a Virtual Channel Indicator (VCI) field, wherein said VCI field is one of said plurality of control fields.

21. The ATM cell of claim 18, wherein the one or more T1 frames are generated by multiple T1 sources.

22. The ATM cell of claim 18, wherein said one or more T1 frame bits are in Extended Superframe format.

23. An ATM cell embodied in a carrier signal, to carry one or more fractional T1 frames from a first Data Terminating Equipment (DTE) over an ATM network to a second DTE, said one or more T1 frames being in Extended Superframe (ESF) format, the ATM cell comprising:
a fractional payload field comprising one or more fractional T1 payloads from respective one or more fractional T1 frames;
a frame bit field comprising one or more T1 frame bits from the respective one or more fractional T1 frames; and
an ATM cell header, comprising:
a plurality of control fields used by the ATM network to route the ATM cell to the second DTE.

24. The ATM cell of claim 23, wherein said frame bit field has an n-byte capacity, wherein if said one or more T1 frame bits do not fill said n-byte capacity, then filling the n-byte capacity of the frame bit field with a plurality of logic "0"s followed by a logic "1", said plurality of "0"s being closet to said ATM cell header, until the n-byte capacity of the frame bit field is filled.

25. The ATM cell of claim 23, wherein said ATM cell payload further comprises a checksum field to detect bit errors in said frame bit field caused by a physical line during transmission.

26. The ATM cell of claim 25, wherein if said one or more fractional T1 payloads, said frame bit field, and said checksum field do not fill said ATM payload, then said ATM cell payload further comprises a spare byte field comprising a plurality of logic "0"s, wherein said spare byte field has a variable length as necessary to fill up the ATM payload.

27. The ATM cell of claim 23, wherein said one or more T1 frames are generated by multiple T1 sources.

28. A system for emulating a T1 link over an Asynchronous Transfer Mode (ATM) network between a first Data Terminating Equipment (DTE) and a second DTE, comprising:

ATM cell transmitter at the first DTE to load one or more T1 frames from the T1 link into an ATM cell, said one or more T1 frames being in Extended Superframe (ESF) format, wherein the ATM cell comprises a ATM cell header and a ATM cell payload, comprising:
means for inserting one or more T1 payloads from respective one or more T1 frames into said ATM cell payload; and
means for replacing one or more header bits in the ATM cell header with one or more T1 frame bits from said respective one or more T1 frames.

29. The system of claim 28, further comprising:
a SONET transmitter comprising a means for loading said ATM cell into a SONET signal;
an ATM network comprising a means for carrying said SONET signal to the second DTE;
a SONET receiver comprising a means for unloading said ATM cell from said SONET signal;
an ATM receiver comprising a means for unloading said one or more T1 payloads from the ATM cell, and further comprising a means for sending said one or more T1 payloads to a switch matrix; and
a switch matrix comprising a means for de-multiplexing said one or more T1 payloads.

30. A system for emulating a fractional T1 link over an Asynchronous Transfer Mode (ATM) network between a first Data Terminating Equipment (DTE) and a second DTE, comprising:

an ATM cell transmitter, to load one or more fractional T1 frames from the fractional T1 link into an ATM cell, said one or more fractional T1 frames being in Extended Superframe (ESF) format, wherein the ATM cell comprises a ATM cell header and a ATM cell payload, comprising:
means for loading one or more fractional T1 payloads from respective one or more fractional T1 frames into a fractional payload field of said ATM cell payload;
means for loading one or more T1 frame bits from said respective fractional T1 frames into a frame bit field for said ATM cell payload; and
means for generating an ATM cell header comprising a plurality of control fields used by the ATM network to route said ATM cell to the second DTE.

31. The system of claim 30, further comprising a checksum generator comprising a means for generating a checksum field to detect bit errors in said frame bit field caused by a physical line during transmission.

32. The system of claim 31, wherein if said one or more fractional T1 payloads, said flame bit field, and said checksum field do not fill said ATM payload, then said ATM cell transmitter further comprises a means for generating a spare byte field comprising a plurality of logic "0"s, wherein said spare byte field has a variable length as necessary to fill up the ATM payload.

33. A method of loading one or more frames from a time division multiplexed (TDM) link into a first cell to carry digital data in the one or more frames over a cell-switched network, said one or more frames being in Extended Superframe (ESF) format, wherein each frame comprises a frame bit and a frame payload, wherein each cell comprises a cell header and cell payload, the method comprising the steps of:
inserting one or more payloads from respective one or more frames in a first cell payload; and
replacing one or more header bits in a first cell header with one or more frame bits from the respective one or more frames.

34. The method of claim 33, wherein the TDM communications link is one of a T1 link and an E1 link.

35. A system for loading one or more frames from a time division multiplexed (TDM) link into a first cell to carry digital data in the one or more frames over a cell-switched network, said one or more frames being in Extended Superframe (ESF) format, wherein each frame comprises a frame bit and a frame payload, wherein each cell comprises a cell header and cell payload, the system comprising:
inserting means for inserting one or more payloads from respective one or more frames into a first cell payload; and
replacing means for replacing one or more header bits in a first cell header with one or more frame bits from the respective one or more frames.

36. The system of claim 35, wherein the TDM communications link is one of a T1 link and an E1 link.

37. The ATM cell of claim 18, wherein said carrier signal is a SONET carrier signal.

38. The ATM cell of claim 23, wherein said carrier signal is a SONET carrier signal.

39. A storage buffer for storing an ATM cell, wherein the ATM cell comprises:
ATM cell payload, comprising one or more T1 payloads from respective one or more T1 frames, said one or more T1 frames being in Extended Superframe (ESF) format; and
ATM cell header, comprising one or more T1 frame bits associated with said one or more T1 payloads.

40. The storage buffer of claim 39, wherein said ATM cell header further comprises a plurality of control fields used to route the ATM cell over an ATM Network, wherein each of said one more T1 frame bits replaces a bit in one of said control fields.

* * * * *